US009973325B2

(12) United States Patent
Sorrentino

(10) Patent No.: US 9,973,325 B2
(45) Date of Patent: May 15, 2018

(54) METHODS, APPARATUSES, AND COMPUTER PROGRAM PRODUCTS FOR GENERATING FRACTIONAL GUARD PERIODS

(71) Applicant: TELEFONAKTIEBOLAGET LM ERICSSON (PUBL), Stockholm (SE)

(72) Inventor: Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 123 days.

(21) Appl. No.: 15/025,189

(22) PCT Filed: Nov. 1, 2013

(86) PCT No.: PCT/SE2013/051286
§ 371 (c)(1),
(2) Date: Mar. 25, 2016

(87) PCT Pub. No.: WO2015/047144
PCT Pub. Date: Apr. 2, 2015

(65) Prior Publication Data
US 2016/0241378 A1    Aug. 18, 2016

Related U.S. Application Data

(60) Provisional application No. 61/883,636, filed on Sep. 27, 2013.

(51) Int. Cl.
*H04L 5/14* (2006.01)
*H04W 56/00* (2009.01)
(Continued)

(52) U.S. Cl.
CPC ............ *H04L 5/14* (2013.01); *H04L 27/2602* (2013.01); *H04L 27/2605* (2013.01);
(Continued)

(58) Field of Classification Search
CPC ....................................................... H04L 5/14
See application file for complete search history.

(56) References Cited

U.S. PATENT DOCUMENTS 5,436,904 A * 7/1995 Pequet ................. H04B 7/2643
370/347
6,088,327 A * 7/2000 Muschallik ........... H04L 27/265
370/203

(Continued)

FOREIGN PATENT DOCUMENTS

WO    2013128370 A1    9/2013

OTHER PUBLICATIONS

International Search Report and Written Opinion for International Patent Application No. PCT/SE2013/051286, dated Jul. 8, 2014, 12 pages.

(Continued)

*Primary Examiner* — Hassan Phillips
*Assistant Examiner* — Prenell Jones
(74) *Attorney, Agent, or Firm* — Sage Patent Group

(57) ABSTRACT

A method, system, and computer program product is provided for transmitting output symbols in sub-slots that each have a pre-determined length. A UE (102) generates (1402) a first output symbol having a first symbol length, and transmits (1404) the first output symbol with a guard period having a guard period length. During the guard period, no transmission is made by the UE (102). The sum of the first symbol length and the guard period length is less than or equal to the predetermined length. Further, the UE (102) generates (1406) a plurality of other output symbols that each have the predetermined length. Then, immediately following the transmission of the first output symbol, the UE transmits (1408) the plurality of other output symbols. Such a resulting fractional guard period located either at the beginning or the end of a subframe prevents collision or (Continued)

overlapping of D2D communication and normal UE to eNB transmissions.

17 Claims, 22 Drawing Sheets

(51) Int. Cl.
    *H04W 72/04*     (2009.01)
    *H04L 27/26*     (2006.01)

(52) U.S. Cl.
    CPC ...... *H04L 27/2633* (2013.01); *H04L 27/2636* (2013.01); *H04W 4/70* (2018.02); *H04W 56/003* (2013.01); *H04W 56/0045* (2013.01); *H04W 72/0446* (2013.01)

(56) References Cited

U.S. PATENT DOCUMENTS

| | | | | |
|---|---|---|---|---|
| 9,008,159 | B2* | 4/2015 | Afkhami | H04B 3/46 375/219 |
| 9,106,970 | B1* | 8/2015 | Beser | H04L 12/12 |
| 9,210,678 | B2 | 12/2015 | Sorrentino | |
| 2008/0198942 | A1* | 8/2008 | Akella | H04L 25/0232 375/260 |
| 2010/0091702 | A1* | 4/2010 | Luo | H04J 11/0069 370/328 |
| 2010/0195563 | A1* | 8/2010 | Jong | H04B 7/18513 370/321 |
| 2011/0110340 | A1* | 5/2011 | Lakkis | H04W 74/08 370/336 |
| 2011/0280238 | A1* | 11/2011 | Kreuzer | H04L 5/0042 370/347 |
| 2012/0314786 | A1* | 12/2012 | Atungsiri | H04L 5/0001 375/260 |
| 2013/0028175 | A1* | 1/2013 | Jong | H04B 7/18513 370/321 |
| 2014/0355572 | A1* | 12/2014 | Khandekar | H04W 52/52 370/336 |

OTHER PUBLICATIONS

LG Electronics: "Synchronization for D2D communications", 3GPP TSG RAN WG1 Meeting #74, R1-133384, Barcelona, Spain, Aug. 19-23, 2013, http://www.3gpp.org/ftp/tsg_ran/WG1_RL1/TSGR1_74/Docs/ [retrieved on Aug. 10, 2013],11 pages.

Alcatel-Lucent Shanghai Bell et al: "D2D Discovery Signal Design", 3GPP TSG RAN WG1 Meeting #74bis, R1-134231, Guangzhou, China, Oct. 7-11, 2013, http://www.3gpp.org/ftp/tsg_ran/WG1_RL1/TSGR1_74b/Docs/ [retrieved on Sep. 28, 2013], 7 pages.

Qualcomm Incorporated: "Techniques for D2D Discovery", 3GPP TSG-RAN WG1 #74, R1-133600, Barcelona, Spain, Aug. 19-23, 2013, http://www.3gpp.org/ftp/tsg_ran/WG1_RL1/TSGR1_74/Docs/ [retrieved on Aug. 10, 2013], 26 pages.

\* cited by examiner

METHODS, APPARATUSES, AND COMPUTER PROGRAM PRODUCTS FOR GENERATING FRACTIONAL GUARD PERIODS

CROSS-REFERENCE TO RELATED APPLICATIONS

This application is a 35 U.S.C. § 371 National Phase Entry Application from PCT/SE2013/051286, filed Nov. 1, 2013, and designating the United States, which claims priority to U.S. Provisional Application No. 61/883,636, filed on Sep. 27, 2013. The above-identified applications are incorporated by reference in their entirety.

TECHNICAL FIELD

This disclosure relates to apparatuses, methods and computer program products for generating fractional guard periods for IDFT-modulated signals.

BACKGROUND

Among the uses of local IP-based services provided by 3GPP LTE include direct communication between user equipments (UEs) in proximity (e.g., typically less than a few tens of meters, but sometimes up to a few hundred meters) of each other. Such device-to-device (D2D) communication provides advantages over communication between a UE and a radio access network (RAN), such as UE-eNB communication. Such advantages include capacity gain, peak rate gain, and latency gain. In addition, D2D communication allows UEs to sense their proximity to each other, which enables proximity-based services (ProSe) and applications.

D2D communication may involve many-to-many communication, in which each transmitting UE targets multiple receiving UEs (i.e., a broadcast to multiple UEs) positioned at different locations. Because propagation delays are different for each D2D link between two UEs, a transmitted D2D signal arrives at different UEs with different delays with respect to a synchronization reference signal. The different propagation delays may cause interference in D2D communication.

SUMMARY

This disclosure relates to generating one or more guard periods to reduce the effect of interference among radio signals. For instance, in LTE systems, a user equipment (UE) can engage in both device-to-device (D2D) communication and in communication with a radio access network (RAN) (i.e., cellular communication). LTE allows D2D communication to share a part of the spectrum used for uplink (UL) cellular communication. To avoid interference, UEs may switch between D2D communication and UL cellular communication, such as through a time division mode. However, because the D2D communication and UL cellular communication may rely on different values for synchronization, and because of differences in propagation delay between D2D communication signals (D2D signals) and UL cellular communication signals (UL signals), the switching may not be perfectly synchronized. As a result, interference may occur between D2D signals and UL signals. For example, if D2D and UL signals are allocated transmission time in units of sub-frames (e.g., 1 msec intervals), a UE may still be receiving a D2D sub-frame while it begins transmitting a UL sub-frame, resulting in interference between the two sub-frames.

In some cases, the interference occurs at a beginning or a tail end of a communication period, such as at the beginning or tail end of the D2D sub-frame or UL sub-frame. For instance, a UE may experience interference when the tail end of a D2D sub-frame being received by the UE overlaps with a beginning of a UL sub-frame being transmitted by the UE. As another example, the tail end of a UL sub-frame directed at a base station may overlap with a beginning of a D2D sub-frame being received by the UE. These examples thus illustrate that interference may occur at a beginning and/or a tail end of sub-frames.

To reduce the effect of interference, a guard period may be used, especially at the beginning and/or tail end of a communication period, such as at the beginning and/or tail end of a sub-frame. During the guard period, a UE refrains from transmitting (e.g., refrains from broadcasting) any signals, because a transmitted signal may be distorted by interference around that time. Refraining from transmitting any signals during the guard period also reduces the amount of interference that other UEs may experience.

In some instances, guard periods have to be implemented within the context of an existing communication protocol. LTE, for example, already has an existing radio frame structure that transmits signals in radio frames (e.g., in 10 msec intervals). In this structure, each frame comprises ten sub-frames that are each, e.g., 1 msec in duration. Each sub-frame is divided into two slots. During the duration of a slot, a UE may transmit six or seven output symbols. In some cases, the output symbols are IDFT-modulated symbols (e.g., OFDMA symbols or SC-FDMA symbols). Each IDFT-modulated symbol includes, for example, a plurality of time-domain samples that represent a linear combination of frequency-modulated (e.g., sub-carrier-modulated) inputs.

In an embodiment, to implement guard periods as part of this radio frame structure, they may be provided as a beginning (e.g., first) sub-slot and/or tail-end (e.g., last) sub-slot of a sub-frame of the radio frame. In this embodiment, when a UE is allocated a sub-frame for D2D communication or UL communication, the entire first sub-slot and/or the entire last sub-slot of the sub-frame may be unused because the entire sub-slot is occupied by a guard period. While this implementation reduces the effect of interference at the first sub-slot and/or the last sub-slot of a radio sub-frame and fits within LTE's radio frame structure, it also incurs a substantial overhead. For a sub-frame having 14 sub-slots, the UE has to remain silent for 2 of the sub-slots. As a result, 14.3% (2/14) of the sub-frame is dedicated to overhead rather than signal transmission.

To reduce overhead, a UE may designate only a fraction of a sub-slot as a guard period, and may transmit signals on the remaining portion of the sub-slot. For instance, the UE may designate approximately half (or 1/3, 1/4, or some other fraction) of the first sub-slot of a sub-frame as the guard period, and may transmit a shortened IDFT-modulated symbol on the remaining portion of the sub-slot. Shortening the guard period in this manner may reduce overhead by about half. In many instances, the shorter guard period still has a sufficient duration to adequately reduce the effect of interference among sub-frames.

In one aspect of the present disclosure, a method, a UE, a system, and computer program product is provided for transmitting output symbols (e.g., IDFT-modulated symbols) in sub-slots (e.g., consecutive sub-slots) that each have a pre-determined length (the length of a sub-slot may be referred to as a "symbol length").

In an embodiment, a UE generates a first output symbol having a first symbol length. In the embodiment, the UE transmits the first output symbol with a guard period having a guard period length. During the guard period, no transmission is made by the UE. In the embodiment, the sum of the first symbol length and the guard period length is less than or equal to the predetermined length.

In the embodiment, the UE generates a plurality of other output symbols that each have the predetermined length. Then, immediately following the transmission of the first output symbol, the UE may transmit the plurality of other output symbols.

In one embodiment a User Equipment, UE, may transmit output symbols in sub-slots, each of the sub-slots having a predetermined length. The UE comprises a processing system and a data storage system, said data storage system comprising instructions executable by said processing system. The instructions, when executed by the processing system, causes the UE to generate a first output symbol having a first symbol length that is shorter than the predetermined length. The instructions, when executed by the processing system, further cause the UE to transmit the first output symbol with a guard period having a guard period length, wherein a sum of the first symbol length and the guard period length is less than or equal to the predetermined length, and wherein no transmission is made by the UE during the guard period. The instructions, when executed by the processing system, further cause the UE to generate a plurality of other output symbols that each have the predetermined length and immediately following the transmission of the first output symbol, transmit the plurality of other output symbols.

In one aspect of the present disclosure, a method, a UE, a system, and computer program product is provided for receiving output symbols (e.g., IDFT-modulated symbols) in sub-slots (e.g., consecutive sub-slots) that each have a pre-determined length (e.g., sub-slot length).

In an embodiment, an UE receives a first signal having the predetermined length. The first signal may include a guard period with a guard period length. The UE further receives a plurality of other signals that each has the predetermined length.

In an embodiment, the UE extracts, from the first signal, a first symbol having a first symbol length. A sum of the first symbol length and the guard period is less than or equal to the predetermined length.

In an embodiment, the UE extracts, from one of the plurality of other signals, a second symbol having a second symbol length. The second symbol length is greater than the first symbol length and is less than or equal to the predetermined length.

In one embodiment a User Equipment, UE, may receive output symbols in sub-slots, each of the sub slots having a predetermined length. The UE comprises a processing system and a data storage system, said data storage system comprising instructions executable by said processing system. The instructions, when executed by the processing system, cause the UE to receive a first signal having the predetermined length, wherein the first signal includes a guard period with a guard period length. The instructions, when executed by the processing system, further cause the UE to receive a plurality of other signals that each has the predetermined length. The instructions, when executed by the processing system, further cause the UE to extract, from the first signal, a first symbol having a first symbol length, wherein a sum of the first symbol length and the guard period length is less than or equal to the predetermined length and to extract, from one of the plurality of other signals, a second symbol having a second symbol length, wherein the second symbol length is equal to the predetermined length.

Features, objects and advantages of the present disclosure will become apparent to those skilled in the art by reading the following detailed description where references will be made to the appended figures in which;

The above and other aspects and embodiments are described in further detail below.

DETAILED DESCRIPTION

Device-to-device (D2D) communication increases a capacity for use equipments (UEs) to communicate among each other, both in environments in which they are outside the coverage of a radio access network (RAN) and in environments in which they are within such coverage. In some instances, D2D communication may coexist with cellular communication (i.e., communication with the RAN) by sharing the uplink (UL) cellular spectrum. For example, in a time division duplex (TDD) system, a UE may switch between using the UL cellular spectrum to perform D2D communication during one time interval and using the UL cellular spectrum to perform cellular communication with an eNB during another time interval. In LTE, the switching may be done on the level of radio sub-frames. In such instances, certain UL cellular communication sub-frames (UL sub-frames) may be reserved for D2D communication. The UE may need to then switch between a D2D mode and a cellular communication mode. Although the switching may rely on a timing advance (TA) value, different UEs may adopt different synchronization references, and may thus adopt different TA values.

Because the UEs may adopt different synchronization references, the switching between D2D communication and cellular communication may not be ideally synchronized. Thus, one UE may continue to use a part of the UL cellular spectrum to conduct D2D communication even as another UE begins using that part of the spectrum for cellular communication. Such an overlap between the D2D communication and cellular communication may thus cause signal interference.

The present disclosure is concerned with coping with that interference by providing a guard period at a beginning and/or end of a time period allocated for wirelessly communicating output symbols, such as IDFT-modulated symbols. The present disclosure is further concerned with providing the guard period without modifying a frame structure used in radio transmission (e.g., the structure of a LTE radio frame), and with reducing a degree of overhead incurred by the guard period.

Figure 1:
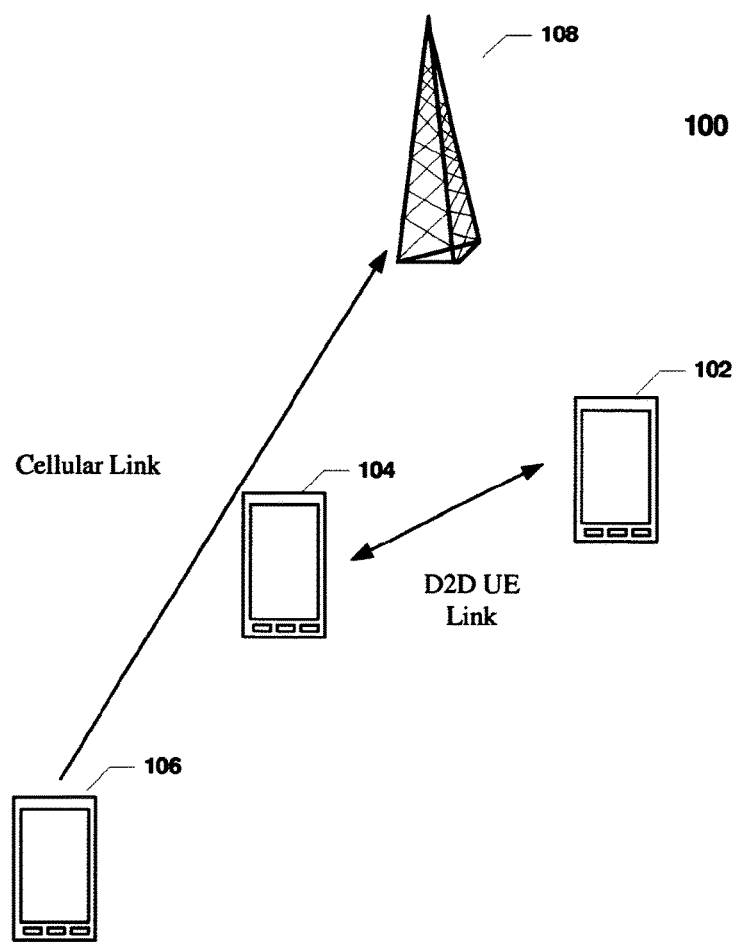
FIG. 1 illustrates a plurality of UEs engaged in either D2D communication or cellular communication.

FIG. 1 illustrates a system 100 in which such interference may occur. The system 100 includes UEs (e.g., UE 102 and UE 104) that can engage in D2D communication and one or more UEs (e.g., UE 106) that can engage in cellular communication with a base station (e.g., base station 108). In an example, UE 104 may experience interference from cellular communication being transmitted by UE 106 and D2D communication being transmitted by UE 102.

Figure 2A:
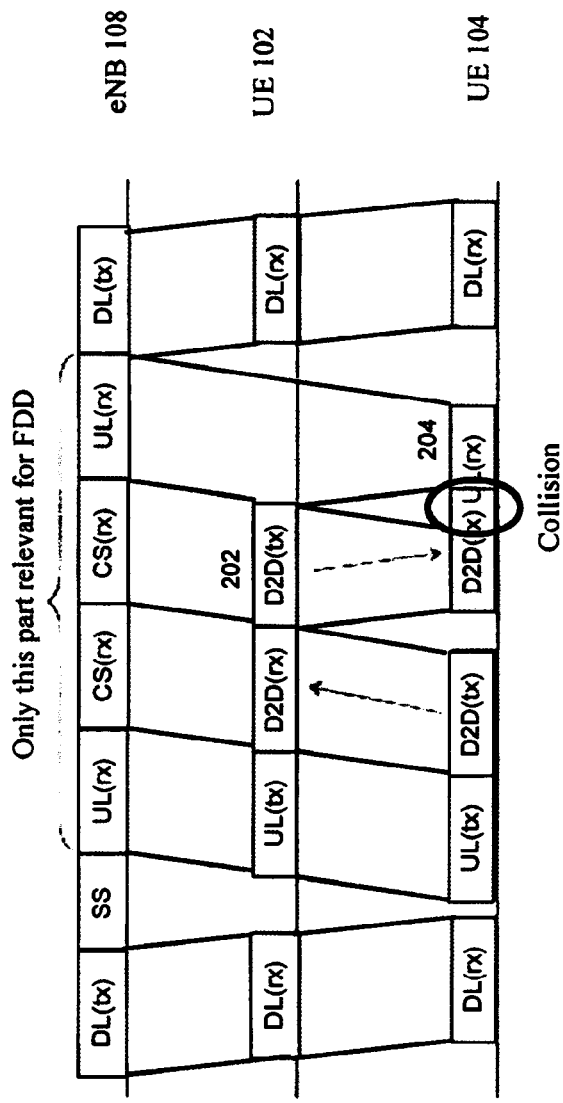
FIGS. 2A-2B illustrate intra-UE or inter-UE interference.
Figure 2B:
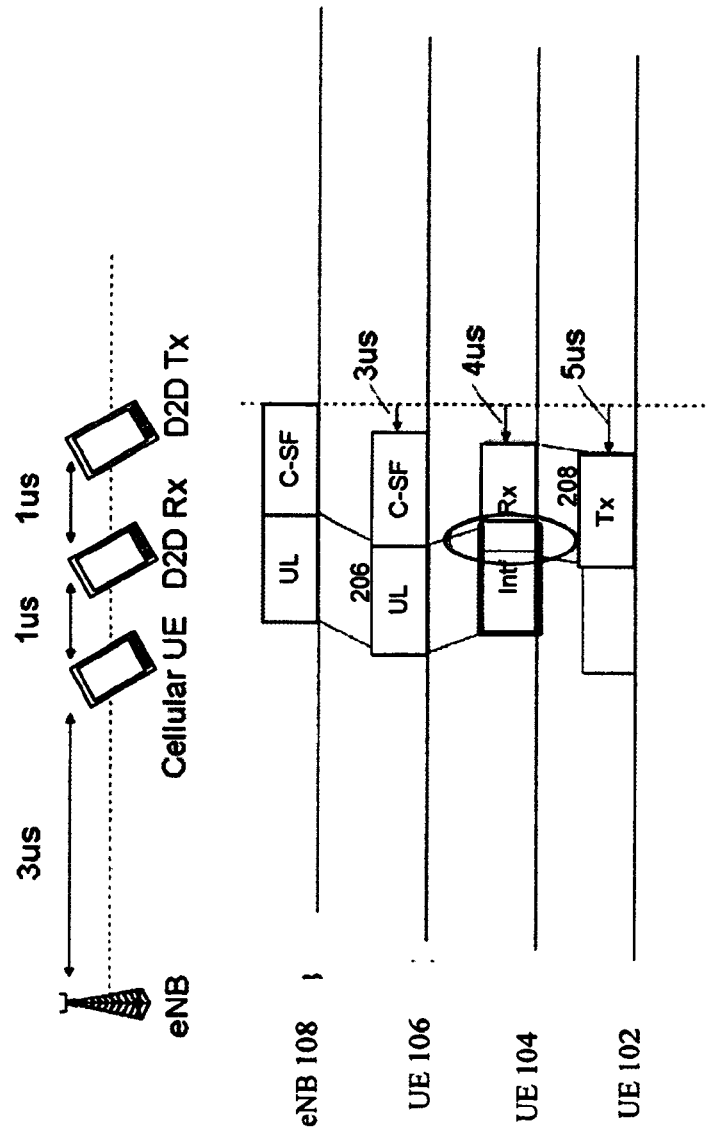

FIGS. 2A-2B illustrate various sub-frames that are transmitted by the UEs and an eNB, and illustrates interference between the sub-frames.

FIG. 2A illustrates intra-UE interference (also referred to as intra-UE collision), in which a UE attempts to receive D2D communication while also attempting to transmit UL communication at the same time. More specifically, FIG. 2A shows that UE 104 may receive a portion of sub-frame 202 from UE 102 while as it simultaneously transmits a sub-frame 204 to eNB 108. This overlap between the received sub-frame 202 and the transmitted sub-frame 204 is referred to as a collision. The collision occurs because, while the UEs rely on a timing advance (TA) value to synchronize the switching between D2D and cellular communication, the TA of D2D transmission and reception may be different. The synchronization is further affected by propagation delay from a transmitting UE to a receiving UE. This overlap in the sub-frames may prevent UE 104 from correctly receiving a portion of sub-frame 202 and may prevent UE 104 from correctly transmitting a portion of sub-frame 204.

FIG. 2B illustrates inter-UE interference, in which a UE is receiving D2D communication while being affected by UL cellular transmission from another UE nearby. More specifically, while UE 104 is receiving a portion of sub-frame 208 from UE 102, signals of sub-frame 206 (which are intended for eNB 108) may reach UE 104 at the same time, causing an overlap between the two sub-frames. This overlap arises because D2D communication and cellular communication may rely on different TA values, because of propagation delay in the D2D communication, or any combination thereof. The overlap may prevent UE 104 from correctly detecting the signals from sub-frame 208.

Similar interference issues may occur even in non-D2D systems. For example, TDD systems suffer from similar issues, as well as heterogeneous deployments where pico nodes provide dual connectivity features.

As illustrated above, D2D communication may experience interference particularly at a beginning of a time period allocated for such communication, at an end of the allocated period, or both. Thus, if UEs in a L IE communication system are allocated sub-frames to perform D2D communication, each UE may particularly experience interference at a beginning of the sub-frame or at a tail end of the sub-frame, where overlap with an interfering sub-frame is likely to occur.

To address this interference, an UE may perform D2D communication with a guard period. The guard period may occupy an interval when the UE is expected to receive interference. During the guard period, the UE does not transmit any signals, because such signals may be distorted by the interference, and may themselves interfere with another UE. Because, as illustrated in FIGS. 2A-2B, the interference experienced during D2D communication is likely to occur at a beginning or tail end of a time period allocated for the D2D communication, the guard period may be located at one or both of the beginning and the end of the allocated time period.

As discussed above, for LTE systems, the time period for D2D communication is allocated in units of sub-frames. A guard period may thus be located at a beginning or an end of a sub-frame. In an embodiment, the guard period has to be consistent with the structure of the sub-frame, which is defined by LTE to include a certain number of slots (e.g., 2 slots), and to include a certain number of IDFT-modulated symbols within each slot (e.g., 6 or 7 symbols). That is, the guard period cannot change the length of the sub-frame, the number or length of slots within the sub-frame, or the length of a sub-slot in which an IDFT-modulated symbol is transmitted. Otherwise, legacy UEs would become incompatible with the use of guard periods.

Figure 3:
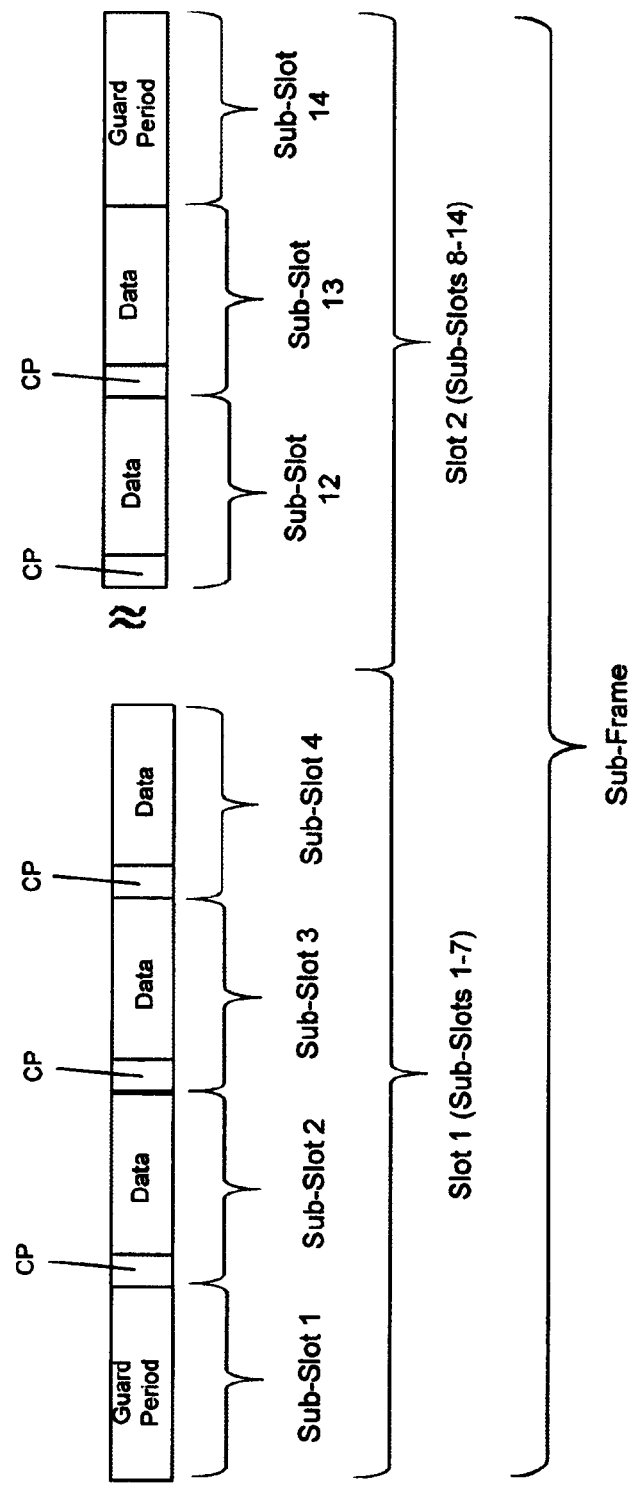
FIG. 3 illustrates a sub-frame having guard periods.

In one implementation fits within LTE's sub-frame structure, an entire sub-slot is used as the guard period, as illustrated in FIG. 3. The figure illustrates a LTE sub-frame that includes two slots. Each of the two slots may transmit up to seven IDFT-modulated symbols in seven sub-slots. An IDFT-modulated symbol may include orthogonal frequency division multiplexing (OFDM) symbols, such as an OFDM Access (OFDMA) symbol or a single-carrier frequency division multiplexing access SC-FDMA symbol. An OFDMA symbol is generated through an OFDM operation in which a subset of subcarriers is assigned to a user. A SC-FDMA symbol is generated by applying a DFT operation to a set of input symbols before applying subcarrier mapping and the IDFT operation (e.g., IFFT operation) to the input symbols. In LTE, OFDMA symbols are generated for downlink transmission from an eNB to an UE, while SC-FDMA symbols are generated for uplink transmission from the UE to the eNB. The DFT operation used in generating SC-FDMA symbols reduce the symbols' peak-to-average power ratio (PAPR), which reduces power requirements for the UE. In an embodiment, an IDFT-modulated symbol is transmitted in a sub-slot. In the embodiment, a plurality of sub-slots make up a slot, and a plurality of slots make up a radio sub-frame.

In this disclosure, if cyclical prefixes are transmitted for an IDFT-modulated symbol, the IDFT-modulated symbol may include the cyclical prefix. The cyclical prefix may include one or more samples from a tail end of an IDFT-modulated symbol. In an embodiment, the transmission of signals may involve no cyclical prefixes.

As FIG. 3 illustrates, while an example sub-frame may have 14 sub-slots that could accommodate up to 14 output symbols, it may actually communicate only 12 output symbols, as the entirety of the other 2 sub-slots are guard periods. Thus, no transmission occurs during sub-slot 1 (i.e., at the beginning of the sub-frame), and no transmission occurs during sub-slot 14 (i.e., at the tail end of the sub-frame).

However, dedicating two entire sub-slots of a sub-frame to guard periods means that 14.3% (i.e., 2/14) of a sub-frame is being used just to guard against interference. No data can be transmitted during such guard periods. Such an amount of overhead may be wasteful.

Figure 4:
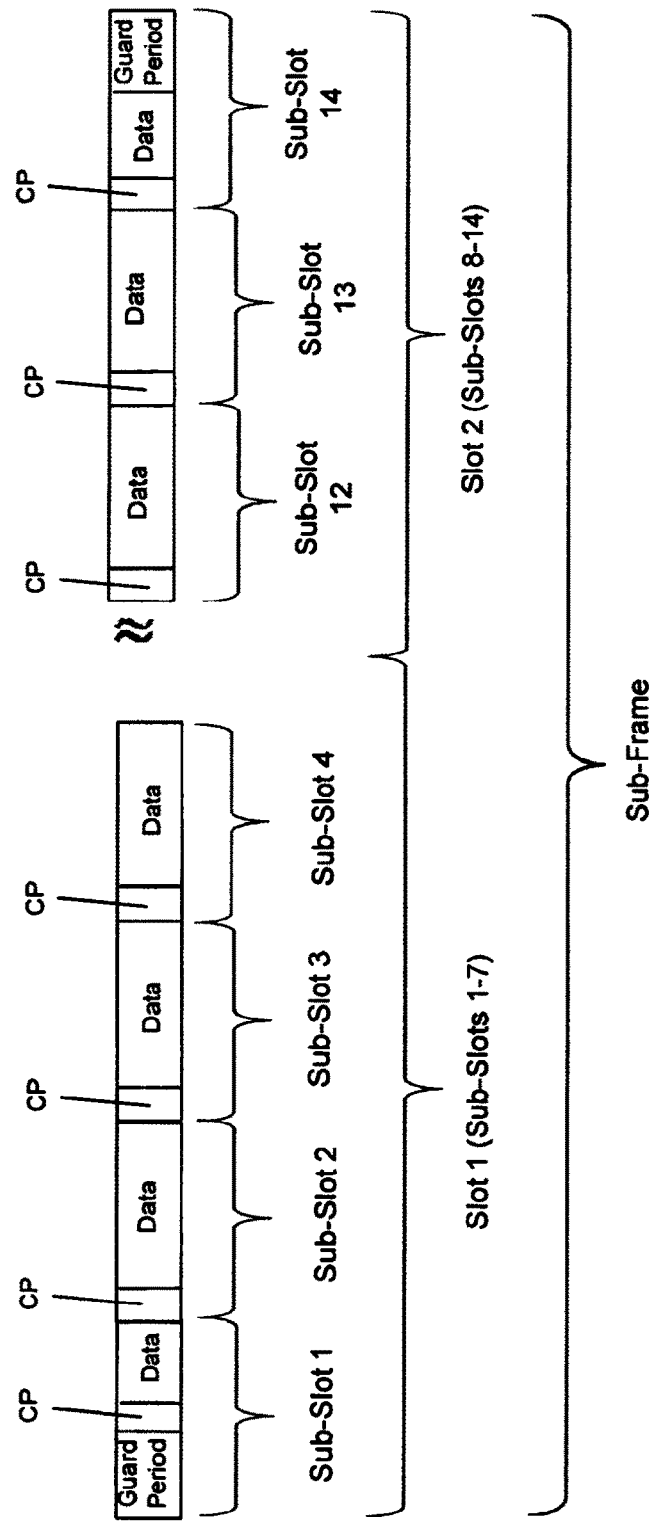
FIG. 4 illustrates a sub-frame having shorter guard periods than those in FIG. 3.

To reduce this overhead, a UE may dedicate only a fraction of a sub-slot as a guard period. FIG. 4 illustrates a resulting sub-frame, in which both sub-slot 1 and sub-slot 14 have a guard period, but each guard period occupies only a fraction of its corresponding sub-slot. The remaining portion of the sub-slot is occupied by a shortened IDFT-modulated symbol. In the illustrated embodiment, the IDFT-modulated symbol includes a cyclical prefix. In other embodiments, however, the IDFT-modulated symbol does not include a cyclical prefix. As described below in more detail, the shorter guard period may be implemented by first generating a shortened IDFT-modulated symbol and adding a cyclical prefix to the shortened IDFT-modulated symbol. The resulting output symbol may occupy only a fraction of the sub-slot. The remaining portion of the sub-slot may be used as the guard period.

Figure 5:
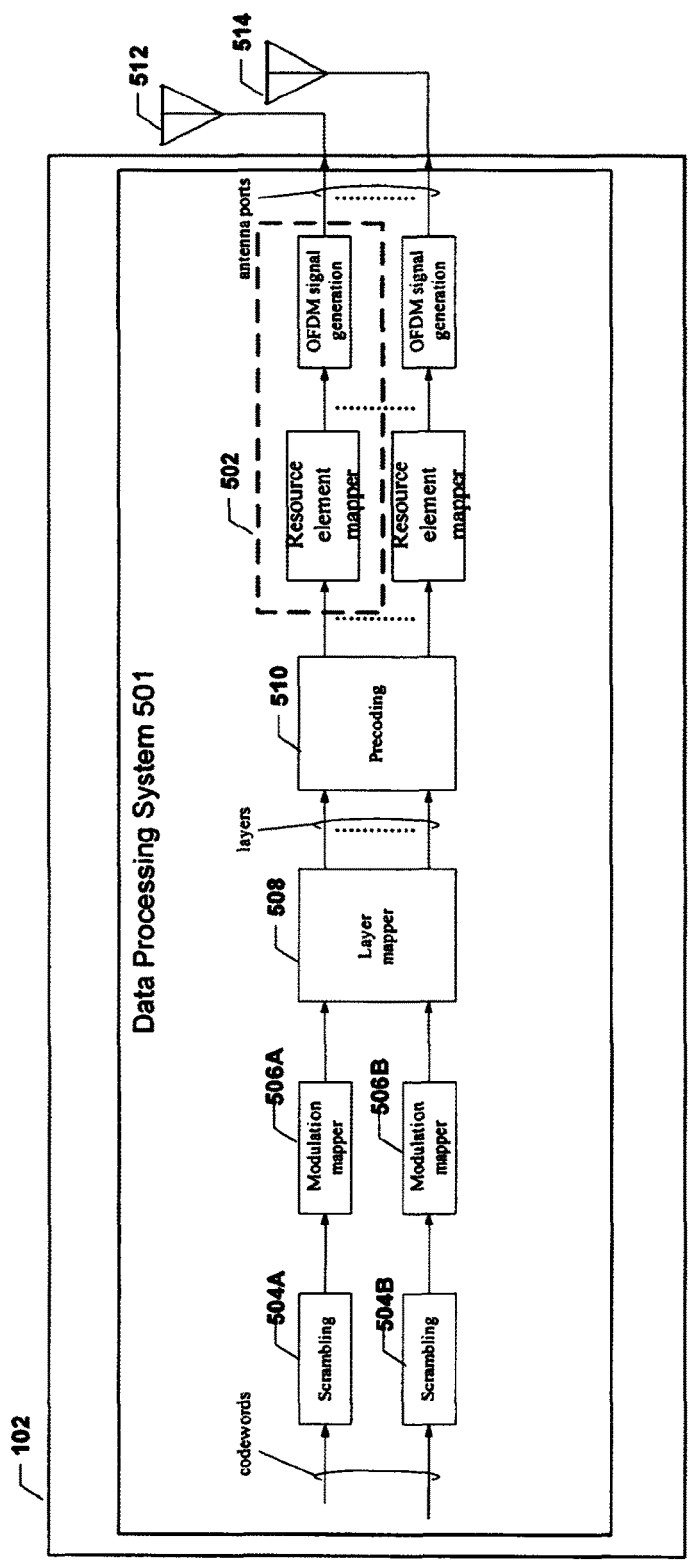
FIG. 5 illustrates example components of a UE, including a signal generation component, for generating a signal for transmission.

FIG. 5 provides an overview of UE components, such as those of UE 102, that are configured to generate an OFDM symbol for transmission. While FIG. 5 shows a UE that generates an OFDM symbol, this disclosure applies more generally to UEs that generate IDFT-modulated symbols. The IDFT-modulated symbols may include an OFDM symbol, such as an OFDMA symbol or a SC-FDMA symbol. An OFDMA symbol generally refers to a symbol generated by an OFDM system in which a subset of sub-carriers may be assigned to an individual UE. A SC-FDMA symbol generally refers to a symbol generated by an OFDM system in which input symbols have been DFT-pre-coded. The DFT pre-coding of input symbols may reduce the peak-to-power ratio of the IDFT output.

FIG. 5 shows that the components are implemented in a data processing system 501, which may include hardware, software, firmware, or any combination thereof. The components ultimately convert data to an OFDM symbol, which is transmitted by antenna 512 and/or antenna 514. The two antennas may be used to perform beamforming during transmission of the OFDM symbols.

Before an OFDM symbol is generated in the illustrated embodiment, a transport block holding data is converted into codewords. The conversion may, for example, add error protection to the transport blocks. One or more scrambling components 504A, 504B may scramble the codewords. In an embodiment, the scrambling may be based on the UE's cell radio network temporary identifier (C-RNTI). The scrambled codewords may be converted to one or more modulated symbols (also referred to as encoded symbols) by one or more modulation mappers 506A, 506B. The modulation mapper 506A, 506B may include one or more modulation and coding scheme (MCS) components, which may map a value or set of values to a modulated symbol. The mapping may, for instance, be based on QPSK, 16QAM, 64 QAM, or any other modulation and coding scheme. The modulated symbols may be mapped by a layer mapper 508 into one or more layers (e.g., one or more streams). The mapped, modulated symbols may then be pre-coded by a precoding component 510. In one instance, the modulated symbols may be pre-coded so as to facilitate beamforming at the antennas 512 and 514. In one instance, the modulated symbols may be DFT-precoded so that the output symbols generated by the data processing system 501 are SC-FDMA symbols. The precoding component 510 may combine the beamforming and DFT-precoding functionalities. The pre-coded symbols are input to at least one symbol generation component 502. The symbol generation component 502 includes a resource element mapper and a component configured to generate an OFDM symbol (or any other IDFT-modulated symbol).

Figure 6:
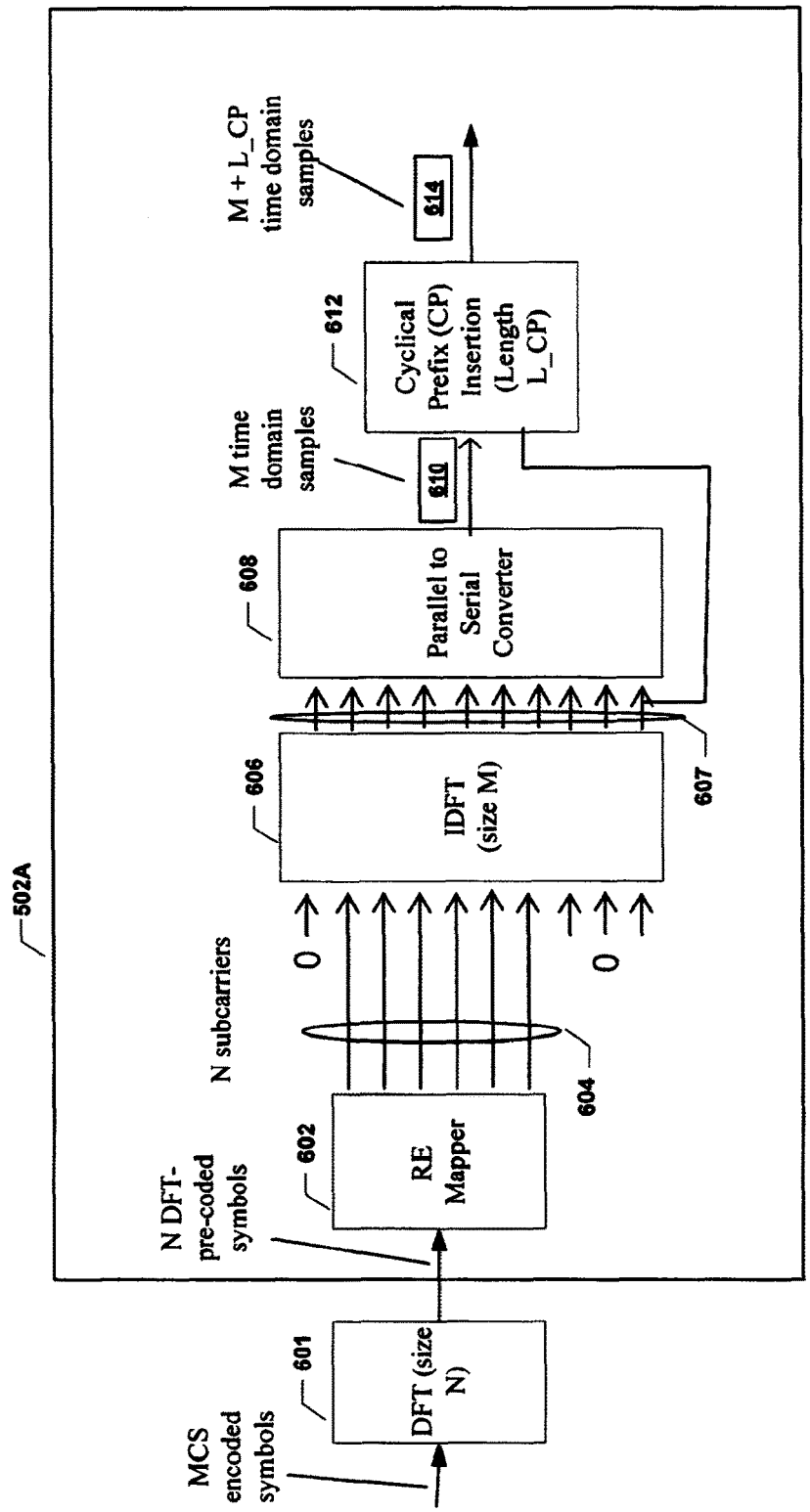
FIG. 6 illustrates an example signal generation component.

FIG. 6 illustrates an example symbol generation component 502A that generates a conventional IDFT-modulated symbol. More specifically, the component 502A includes a RE mapper 602 that allocates resource elements (REs) to N input symbols. The N input symbols include, for example, symbols encoded by the modulation mapper 506A or 506B of FIG. 6. In an embodiment in which the component 502A is configured to generate SC-FDMA symbols, the N input symbols include symbols that are encoded by the modulation mapper 506A or 506B and DFT-pre-coded by DFT component 601. FIG. 6 further shows a RE mapper 602 that maps the N input symbols to N subcarriers 604. An inverse discrete Fourier Transform (IDFT) component 606 converts the N input symbols to an IDFT-modulated symbol (e.g., OFDMA or SC-FDMA symbol). The IDFT component 606 may be implemented to require M inputs. In an embodiment, the number of input symbols N is less than the number of required IDFT inputs M. In such an embodiment, inputs of zero may be used to pad the unused IDFT inputs. The IDFT-modulated symbol that is generated represents a linear combination of the N modulated subcarriers sampled at M points in time. When the IDFT-modulated symbol is generated, a parallel-to-serial converter 608 converts the M parallel samples to a serial IDFT-modulated symbol that includes the M samples. A cyclical prefix (CP) insertion component 612 adds a cyclical prefix (CP) to generate, as the output symbol, a modified IDFT-modulated symbol 614.

Figure 7:
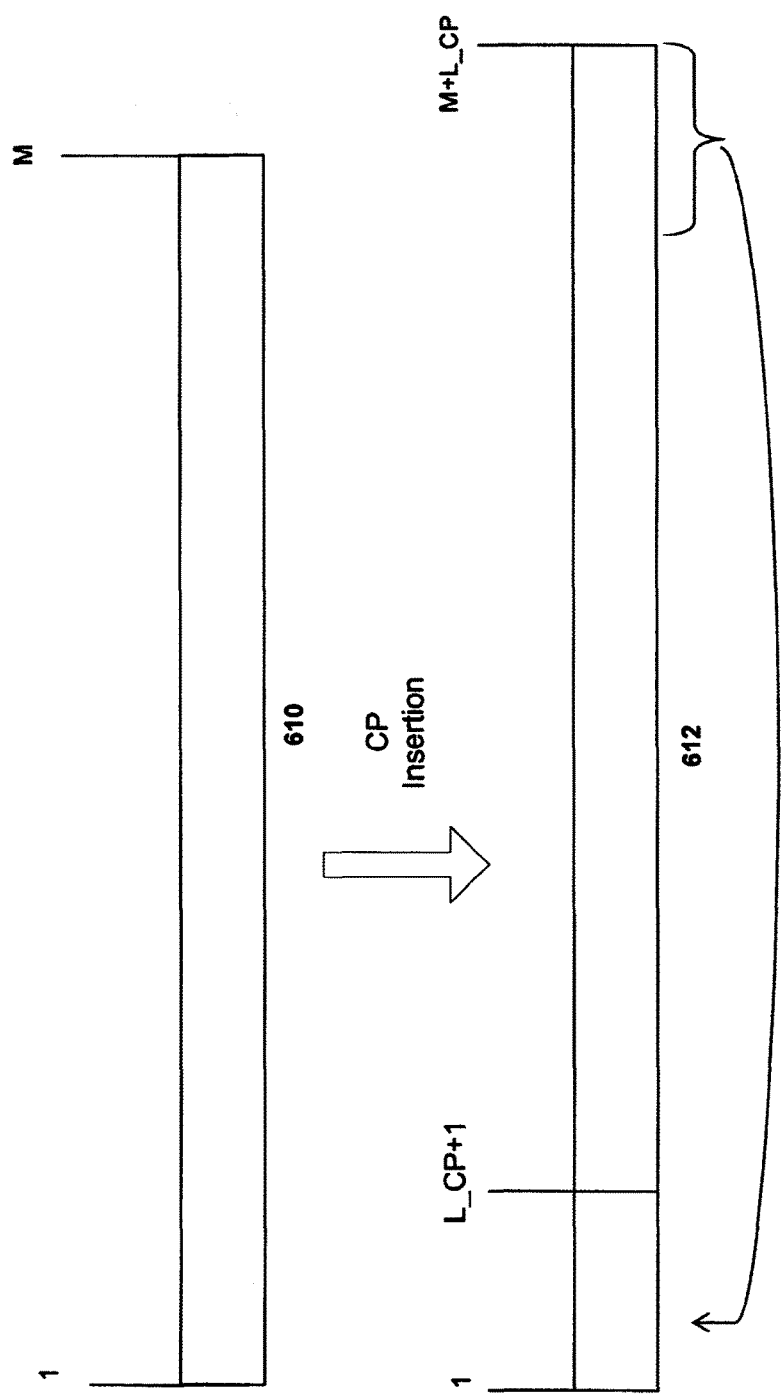
FIG. 7 illustrates an output symbol corresponding to the signal generation component of FIG. 6.

FIG. 7 illustrates the IDFT-modulated symbol 610 generated by the IDFT operation and the modified IDFT-modulated symbol 612 generated by the CP insertion component 612. As FIG. 7 illustrates, the IDFT operation generates a symbol having M samples. In the embodiment, to generate the output IDFT-modulated symbol 612, one or more samples (e.g., L_CP samples) from the tail end of IDFT-modulated symbol 610 is added as a cyclical prefix to symbol 610. In the example illustrated in FIG. 7, the outputM+L_CP samples of symbol 612 is transmitted in a sub-slot of a LTE sub-frame.

As discussed above, rather than use an entire sub-slot of a LTE sub-frame as a guard period, a UE may use part of the sub-slot to transmit a shorter IDFT-modulated symbol. The OFDM symbol is shorter in that it has less samples. For instance, while an IDFT operation may output M samples for sub-slots having no guard periods, it may output M/L (L=2, 3, 4, etc.) samples for a sub-slot having a guard period.

In an embodiment, the signal generation component 502B generates the shorter IDFT-modulated symbol by using fewer input symbols. Whereas the signal generation component 502A uses N input symbols, the signal generation component 502B uses N/L (e.g., N/2, N/3, etc.) input symbols. The RE mapper 602 outputs a smaller set of subcarriers 802 compared to the set of subcarriers 604. In the signal generation component 502B, the IDFT component 804 is modified to have a smaller size of M/L. The IDFT component 804 is modified to have this smaller size in order to accommodate the smaller number of subcarriers. This IDFT component 804, which has the smaller size of M/L, generates an IDFT-modulated symbol having M/L samples 806. A parallel to serial converter 808 converts the M/L samples to IDFT-modulated symbol 810. CP insertion component 809 modifies the IDFT-modulated symbol 810 by adding a cyclical prefix to generate IDFT-modulated symbol 812. The output IDFT-modulated symbol 812 has M/L+L_CP samples. In an embodiment, the CP insertion component 809 may insert a guard period by filling the remaining samples of the sub-slot with values of zero. For instance, if a sub-slot accommodates M+L_CP output samples and the output IDFT-modulated symbol has M/2+L_CP samples, the CP insertion component 809 may insert M/2 samples of zeros as a guard period in an embodiment, a sub-frame may have a first sub-slot that begins with a guard period of, e.g., M/2 samples followed by an IDFT-modulated symbol of M/2+L_CP samples. The sub-frame may further have middle sub-slots that have no guard period and an IDFT-modulated symbol of M+L_CP samples. In the embodiment, the sub-frame may also have a last sub-slot that begins with an IDFT-modulated symbol of M/2+L_CP samples followed by a guard period of M/2 samples.

In an embodiment in which the component 502B is configured to generate SC-FDMA symbols, the N/L input symbols include symbols that are encoded by the modulation mapper 506A or 506B and DFT-pre-coded by DFT component 801.

Figure 9:
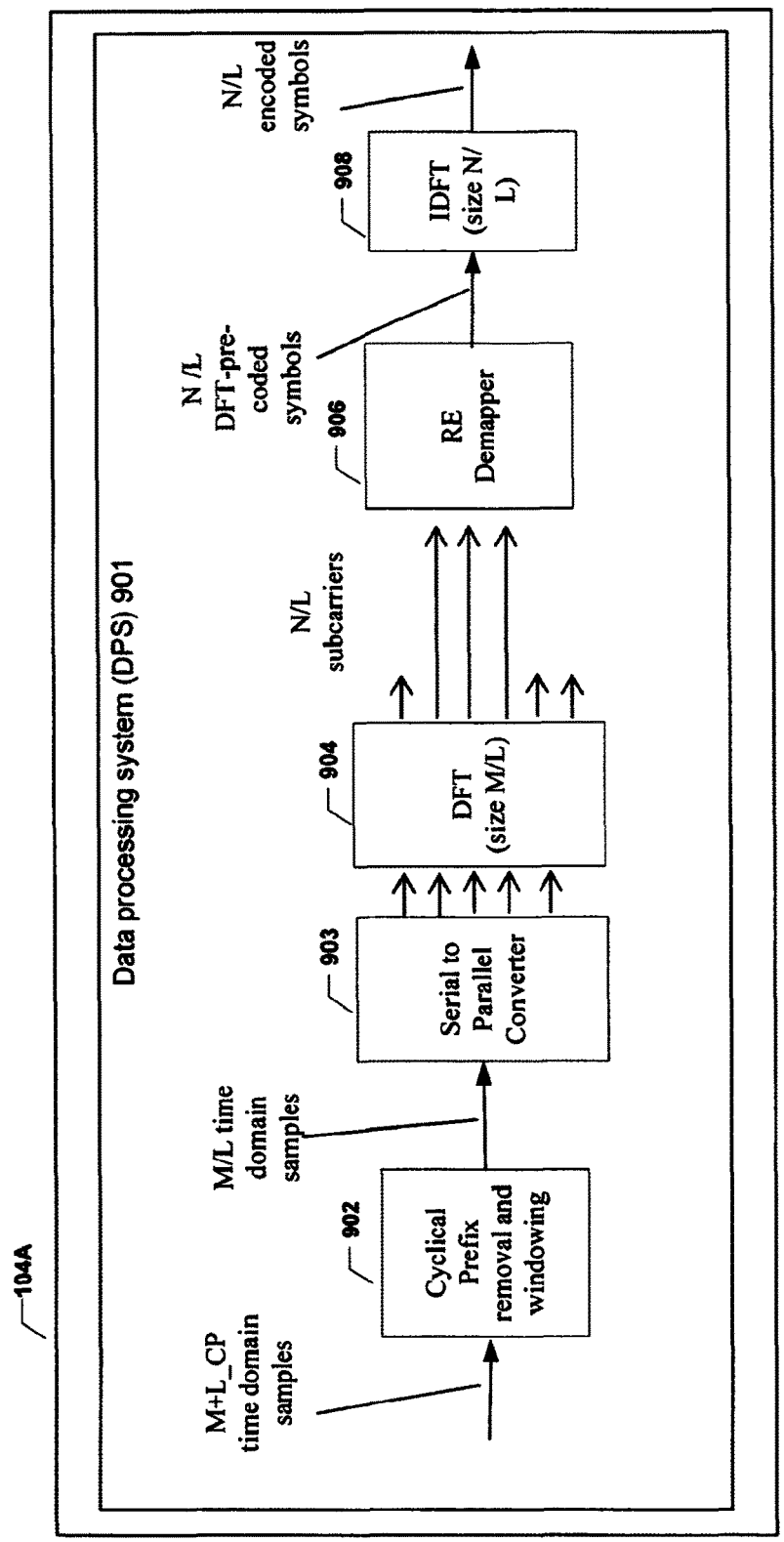
FIG. 9 illustrates an example signal reception and processing component.

FIG. 9 illustrates a data processing system 901 that complements the signal generation component 502B. The data processing system 901 may be a part of UE 104A, and may be used to process IDFT-modulated symbols generated by the signal generation component 502B of UE 102. The data processing system (DPS) 901 may include components that reverses the processing performed in signal generation component 502B. In particular, DPS 901 may include a cyclical prefix (CP) removal and windowing component 902 that separates an IDFT-modulated symbol in a sub-slot from a guard period of the sub-slot and removes the CP from the IDFT-modulated symbol. A serial-to-parallel converter 903 reverses the processing of the parallel-to-serial converter 808. A DFT component 904 reverses the transform performed by the IDFT component 804. Note that the DFT component 904 also is implemented to have a size of M/L. The RE demapper 906 reverses the processing of RE mapper 602. In an embodiment, if UE 104A were receiving SC-FDMA symbols, the output of RE Demapper 906 may include symbols that are DFT-pre-coded (from operations performed by DFT component 801). The DFT-pre-coding may be reversed by IDFT component 908.

Figure 8:
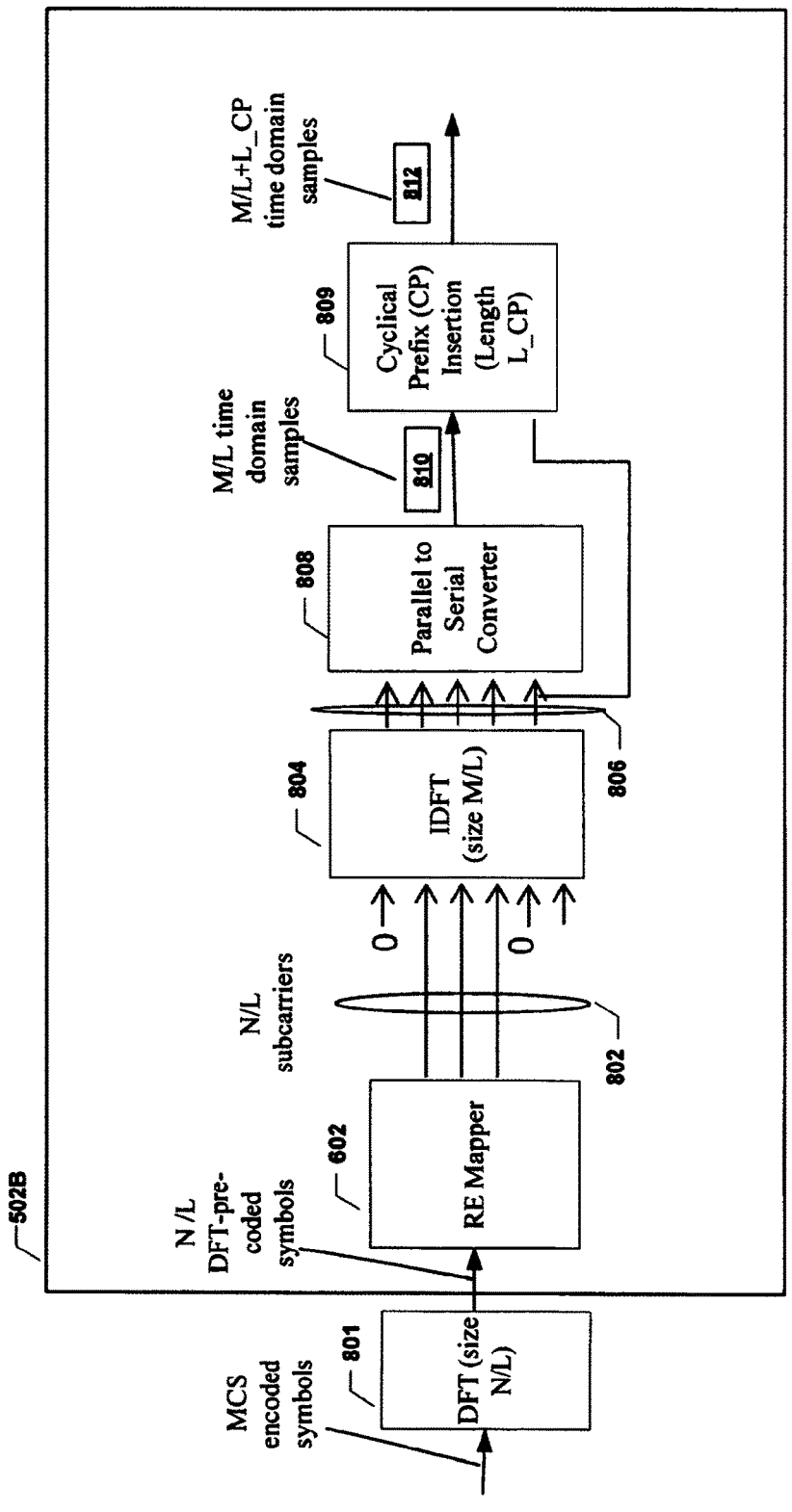
FIG. 8 illustrates an example signal generation component.

Although the signal generation component 502B in FIG. 8 is able to generate a shorter IDFT-modulated symbol, its implementation involves modifying the IDFT component. The IDFT component has to be modified from a component 606 having the size shown in signal generation component 502A to a component 804 that has a smaller size. Such a change may involve a change in hardware or software. For cost and compatibility reasons, it may be desirable to generate a shorter IDFT-modulated symbol without changing the IDFT component 606.

Figure 10:
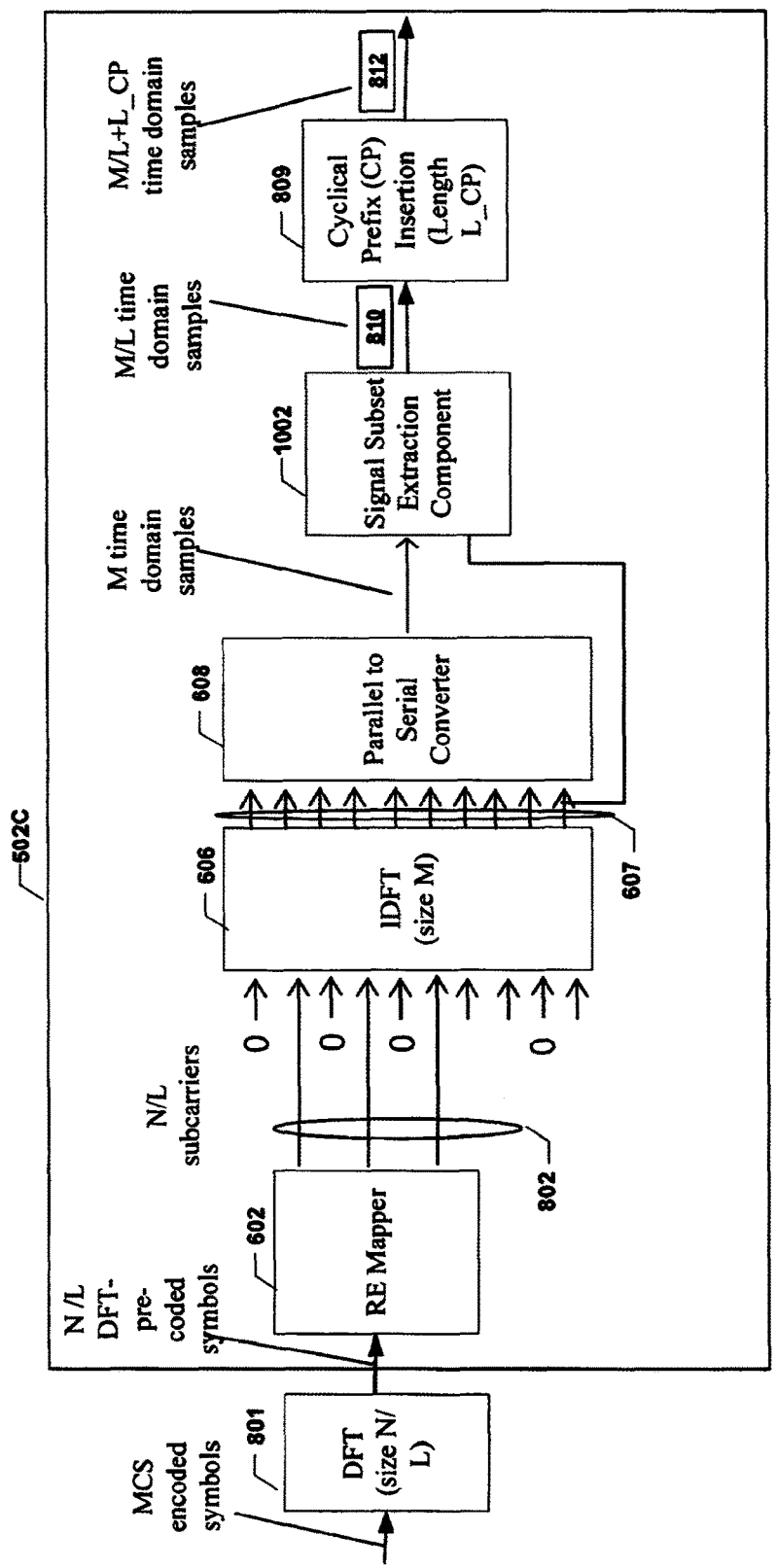
FIG. 10 illustrates an example signal generation component.

FIG. 10 illustrates an example signal generation component 502C that generates a shorter IDFT-modulated symbol without changing the IDFT component 606.

Like in the signal generation component 502A, signal generation component 502C includes the RE mapper 602, IDFT component 606, and parallel to serial converter 608. In an embodiment in which the component 502C is configured to generate SC-FDMA symbols, the N/L input symbols include symbols that are encoded by the modulation mapper 506A or 506B and DFT-pre-coded by DFT component 801.

In FIG. 10, because the IDFT component 606 still has size M, it generates M output samples 607, even though RE mapper 602 outputs only N/L subcarriers based on N/L input symbols. In order to generate a shorter IDFT-modulated symbol having M/L samples, the M samples generated by the IDFT component 606 needs to be reduced to M/L samples.

In an embodiment, the component 502C accomplishes the reduction by interleaving the input symbols to the IDFT component 606 with inputs of zero. Interleaving the input symbols with inputs of zero causes the output of the IDFT component 606 to be periodic. More specifically, interleaving the input symbols by assigning them to every $L_{th}$ subcarrier causes the IDFT output to have L cycles. Each of the L cycles may be a replica of each of the other cycles. A signal subset extraction component 1002 may extract a signal subset of one of the cycles. This extracted subset has M/L samples, and is the shortened IDFT-modulated symbol 810. A CP insertion unit 809 then inserts a CP prefix to create IDFT-modulated symbol 812. In an embodiment, the CP insertion unit 809 may further add a guard period by adding inputs of zero for the remaining samples of the sub-slot.

As a more specific example of the interleaving, the IDFT component 606 may use consecutive sub-carriers $w_1$, $w_2$, $w_3$, $w_4$, etc. Input symbols may be modulated with sub-carriers $w_1$, $w_3$, etc., while inputs of zero may be applied to sub-carrier $w_2$ and sub-carrier $w_4$. Such an interleaving may produce an IDFT output that has two periods. Each period may be a replica of the other. In this example, although the IDFT component 606 generates M samples, the samples are made up of two periods that are the same. An extractor may thus extract one of the replicas, of M/2 samples, as the shortened IDFT-modulated symbol. In an embodiment, a cyclical prefix of L_CP samples may be added to generate an IDFT-modulated symbol having a length of M/2+L_CP samples. This symbol may be transmitted in a sub-slot that accommodates M samples. The sub-slot may have a guard period of M/2 samples that are each zero. The above implementation allows a shortened IDFT-modulated symbol to be generated without having to modify a size of an IDFT component.

Figure 11:
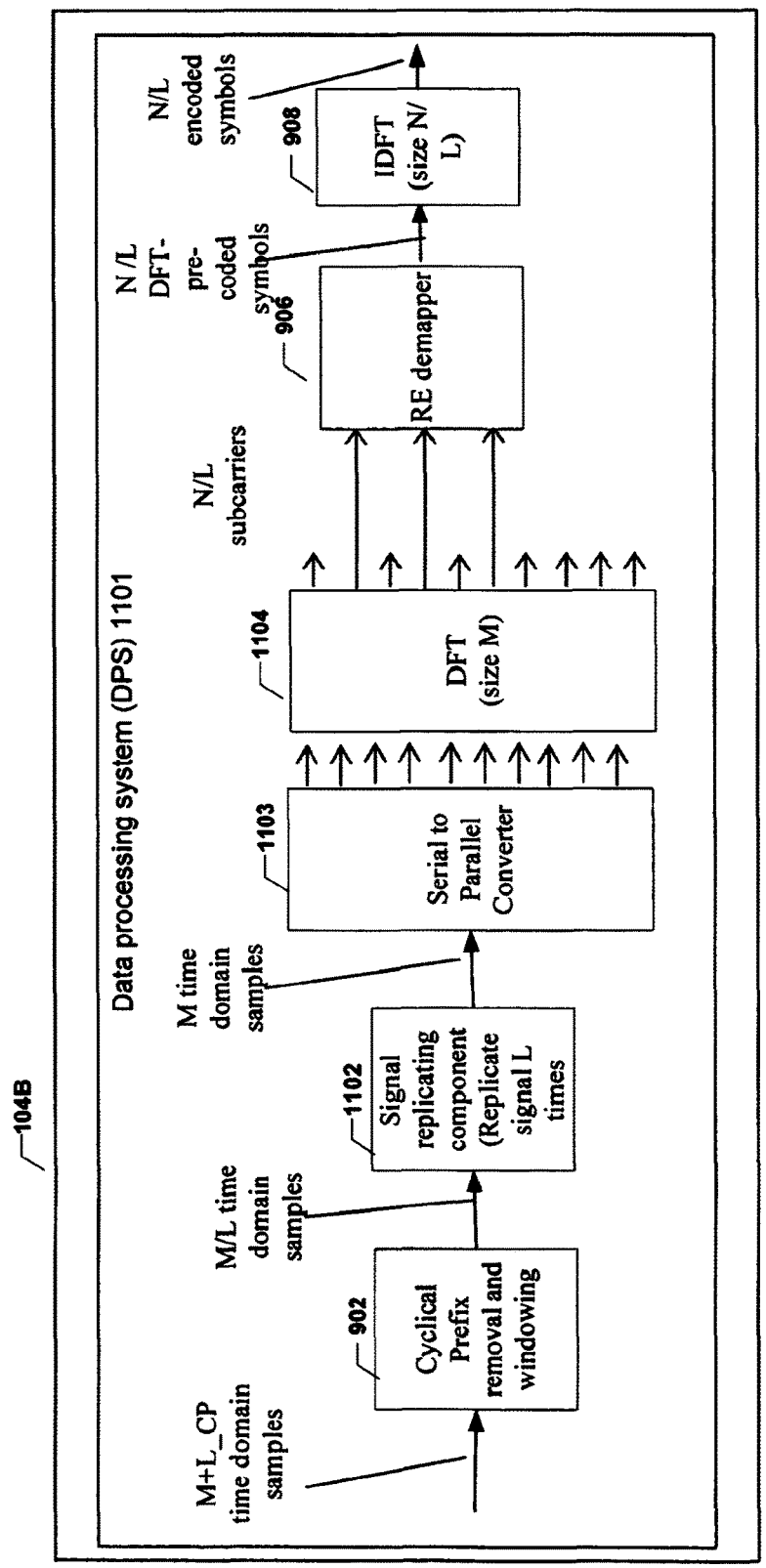
FIG. 11 illustrates an example signal reception and processing component.

FIG. 11 illustrates a data processing system 1101 that complements the signal generation component 502C. The data processing system 1101 may be a part of UE 104B, and it may be used to process IDFT-modulated symbols generated by the signal generation component 502C of UE 102. Like the data processing system 901, data processing system 1101 also has a CP prefix removal and windowing component 902 and a RE demapper 906.

Data processing system 1101 additionally includes a signal replicating component 1102, which reverses the processing of signal subset extraction component 1002. More particularly, the component 1102 generates a longer, periodic symbol of M samples from a shortened IDFT-modulated symbol of M/L samples. For instance, if the received symbol had M/2 samples, the component 1102 may replicate the M/2 samples and concatenate all the samples to output a symbol having M samples. The serial to parallel converter 1103 converts the M samples to parallel form. A DFT component 1104 reverses the processing of IDFT component 606. The RE demapper 906 reverses the operation of RE mapper 602. In an embodiment, if UE 104B were receiving SC-FDMA symbols, the output of RE demapper 906 may include symbols that are DFT-pre-coded (from operations performed by DFT component 801). The DFT-pre-coding may be reversed by IDFT component 908. The output of the IDFT component 908 may be N/L symbols encoded in a format such as BSK, QPSK, QAM, or any other modulation and coding scheme. Other components of the UE 104B may decode the encoded symbols.

Figure 12:
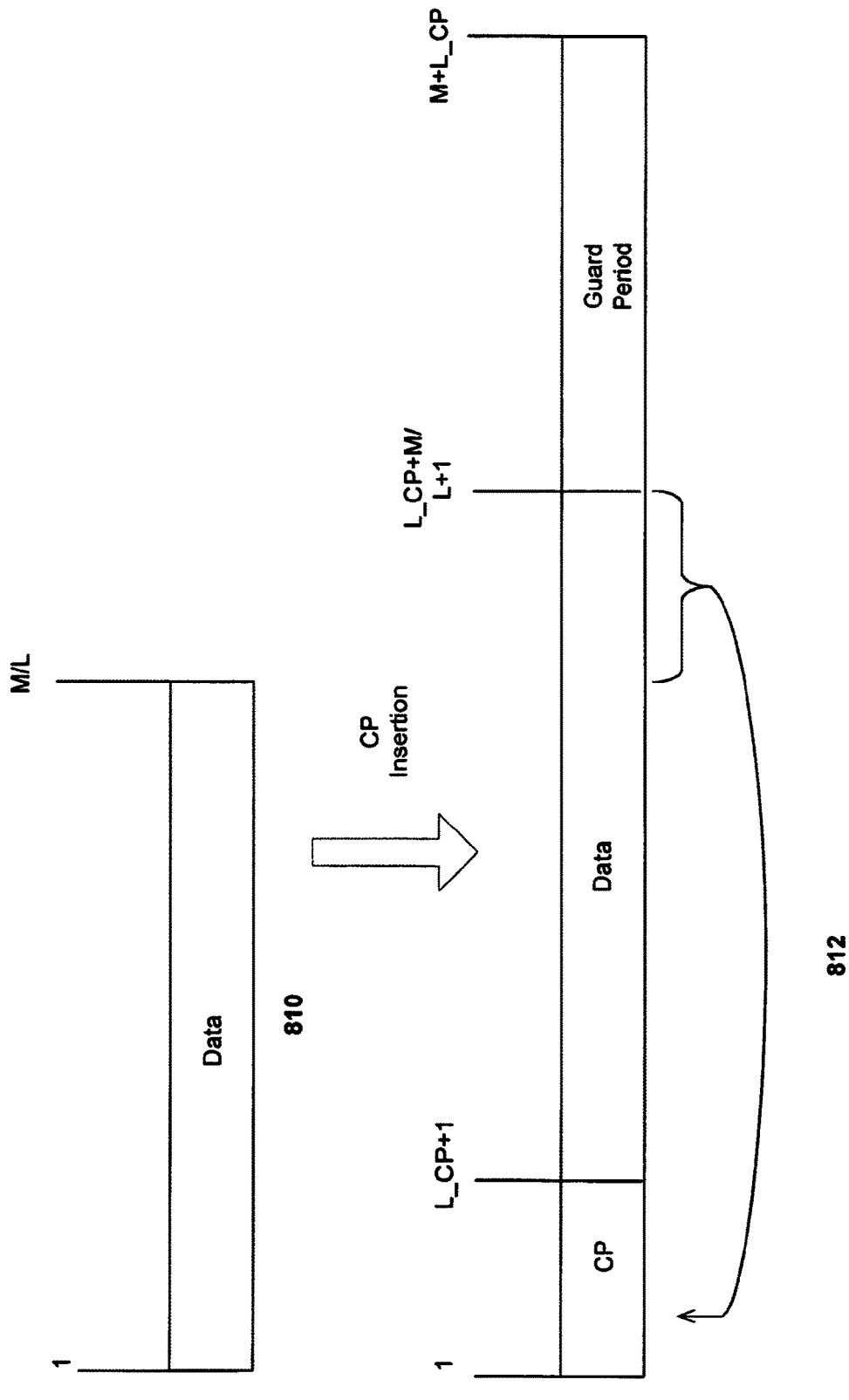
FIGS. 12-13 illustrate output symbols corresponding to the signal generation components of FIGS. 8 and 10.
Figure 13:
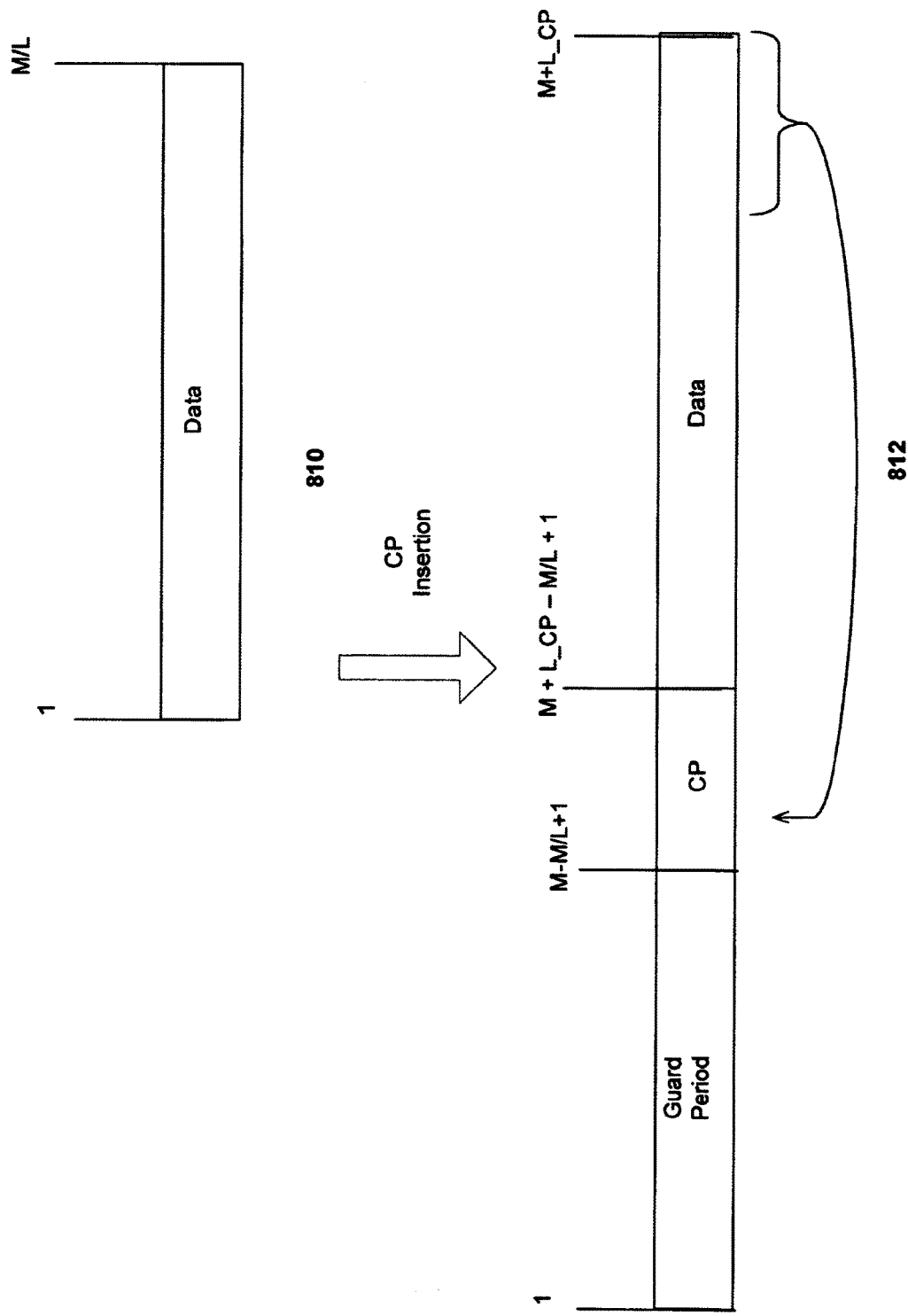

FIGS. 12 to 13 illustrate the shortened IDFT-modulated symbol and the guard period in a beginning or tail sub-slot of a sub-frame. The guard period may be placed at a beginning of the sub-slot or may be placed at an end of the sub-slot, depending on which sub-slot the guard period will occupy. For instance, the guard period shown in FIG. 12 may occupy sub-slot 14, while the guard period shown in FIG. 13 may occupy sub-slot 1. In an embodiment, a sub-frame may have only one guard period, located at either sub-slot 1 or sub-slot 14.

Figure 14:
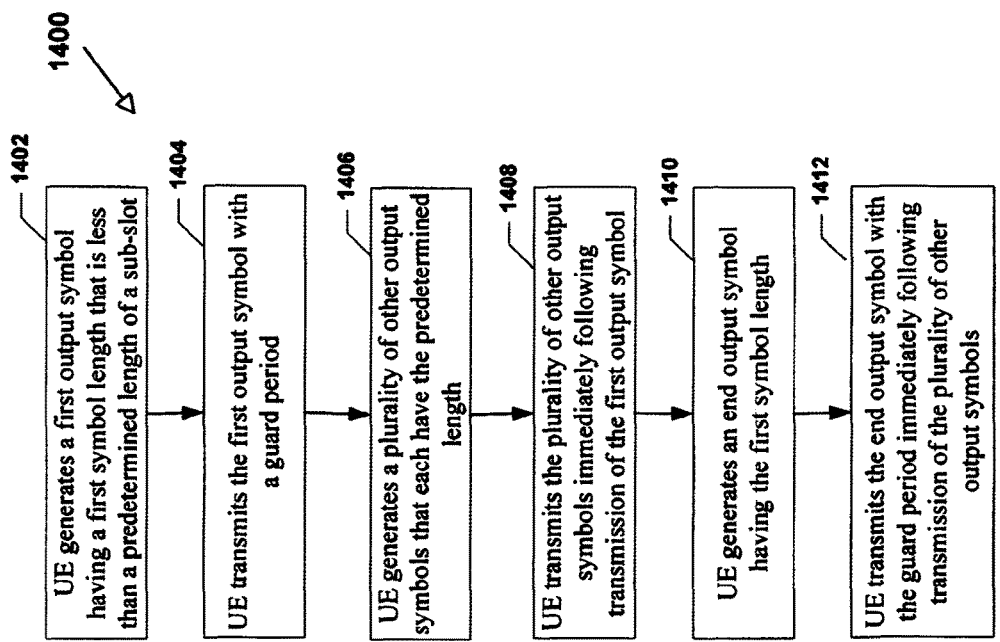
FIGS. 14-19 illustrate flow diagrams according to embodiments of the present disclosure.

FIG. 14 provides a flow diagram that illustrates an example process 1400 for transmitting a shortened symbol and a guard period. In the example, output symbols may be transmitted in sub-slots, which may have a predetermined length (e.g., a sub-slot length). The sub-slot may be one of a plurality of sub-slots that make up a radio sub-frame, which may be allocated to a UE for making D2D or cellular communication. In an embodiment, process 1400 begins at step 1402, in which a UE (e.g., UE 102) generates a first output symbol having a first symbol length that is shorter than the predetermined length. For instance, each sub-slot may have a predetermined length that accommodates M+L_CP samples, and the first symbol may have a first symbol length of M/2 samples or M/2+L_CP samples.

In step 1404, the UE transmits the first output symbol with a guard period having a guard period length. In an embodiment, the sum of the first symbol length and the guard period length is less than or equal to the predetermined length. The predetermined length may accommodate a cyclical prefix (if output symbols include a cyclical prefix) or may have no room for a cyclical prefix (if output symbols do not include a cyclical prefix). In an embodiment, the sum of the first symbol length and the guard period length may be less than the predetermined length if additional output signaling is included in the sub-slot. In an embodiment, the sum of the first symbol length and the guard period length may equal the predetermined length if no additional signaling is included in the sub-slot.

At step 1406, the UE generates a plurality of other output symbols that each have the predetermined length. Thus, step 1406 may generate an output symbol having more samples than the first output symbol. At step 1408, the UE transmits the plurality of other output symbols immediately following transmission of the first output symbol.

In an embodiment, process 1400 may further include steps 1410 and 1412. In step 1410, the UE generates an end output symbol having the first symbol length. In step 1412, the UE transmits the end output symbol with the guard period immediately following transmission of the plurality of other output symbols. The guard period may follow the transmission of the end output symbol. In some cases, the first output symbol and the end output symbol may make up a first symbol and a tail end symbol, respectively, of a sub-frame.

Figure 15:
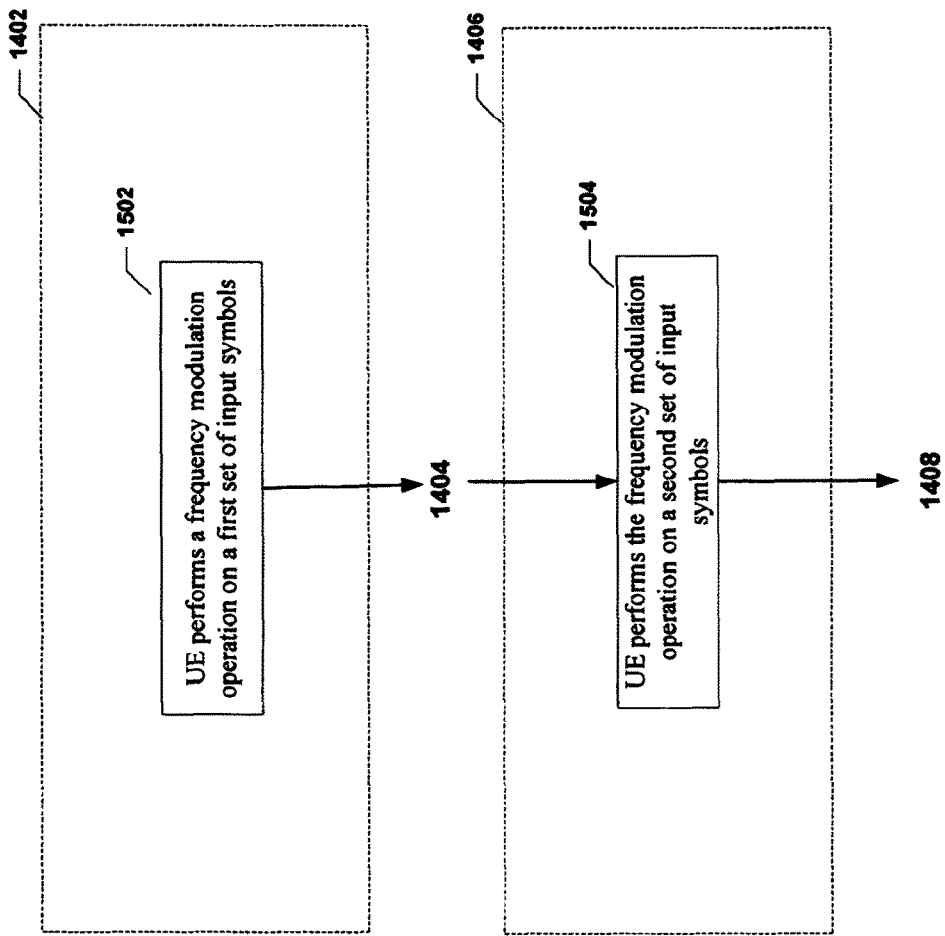

FIG. 15 provides a flow diagram that illustrates a more detailed example of how the first output symbol is generated at step 1402 and how one of the plurality of other output symbols is generated at step 1406. For instance, generating the first output symbol includes step 1502, in which the UE performs a frequency modulation operation (e.g., IDFT) on a first set of input symbols. Generating one of the plurality of other output symbols includes step 1506, in which the UE performs a frequency modulation operation (e.g., IDFT) on a second set of input symbols. Generating one of the plurality of other output symbols may include performing a frequency modulation operation on a second set of input symbols. In the example, the first set of input symbols (e.g., size N/L) is smaller than the second set of input symbols (e.g., size N). In an embodiment, the frequency modulation outputs a set of sample values. The values may, for instance, sample an inverse Fourier transform of the input symbols in M or M/L points in time. The number of sample values may depend on the size of the input. By providing a set that has fewer input symbols (e.g., N/L input symbols), an output having fewer sample values (e.g., M/L sample values) may be generated.

Figure 16:
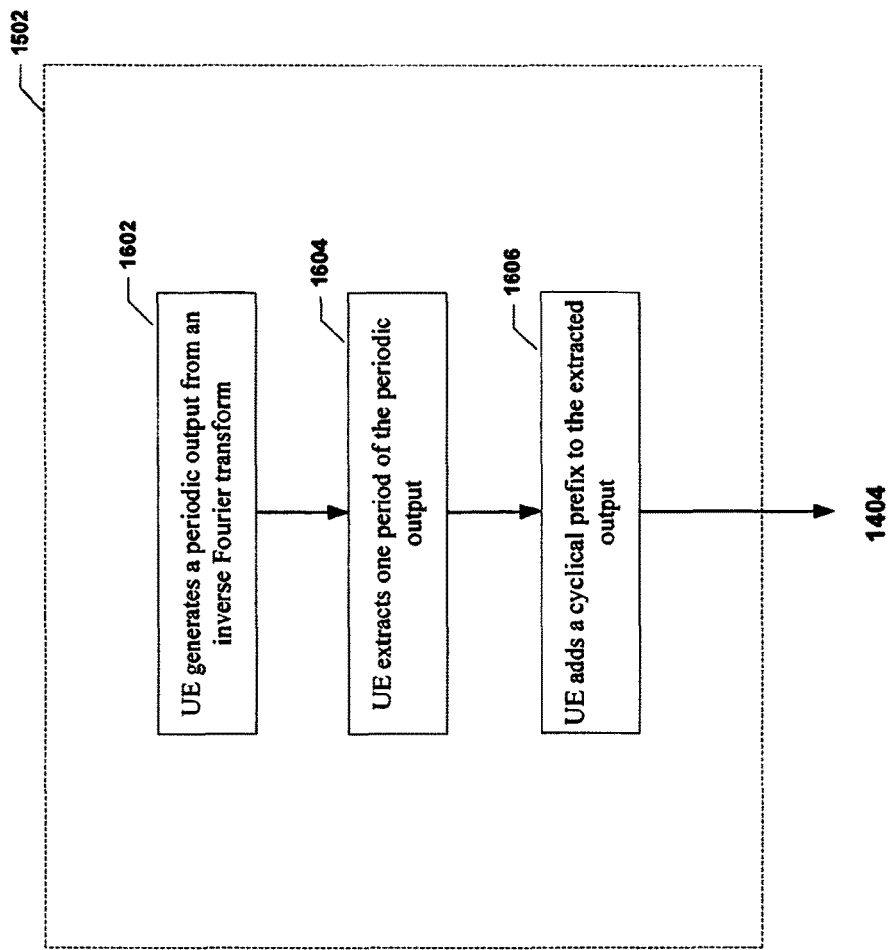

FIG. 16 provides a flow diagram that illustrates how the first output symbol (e.g., first IDFT-modulated symbol) is generated with the frequency modulation. The example that is illustrated involves interleaving input symbols with inputs of zero. For instance, at step 1602, the UE generates a periodic output by performing an inverse Fourier transform in which non-consecutive sub-carrier frequencies are assigned to input symbols, and the in-between sub-carrier frequencies are assigned input values of zero. For example, if the IDFT uses consecutive sub-carriers $w_1$, $w_2$, $w_3$, $w_4$, etc., input symbols may be modulated with sub-carriers $w_1$ and $w_3$, while inputs of zero may be applied to sub-carriers $w_2$ and $w_4$. In general, the interleaving may apply an input symbol to every $L_{th}$ of the consecutive sub-carriers, and assign an input of zero to each of the other consecutive sub-carriers. This interleaving of the input symbols with input values of zero creates an IDFT output that is periodic.

In step 1604, the UE extracts one period of the periodic output. For instance, if the IDFT output has two periods, the UE extracts half of the IDFT output. At step 1606, the UE adds a cyclical prefix to the extracted output. In an embodiment, the sum of the length of the cyclical prefix and the length of the extracted period equals the first symbol length.

Figure 17:
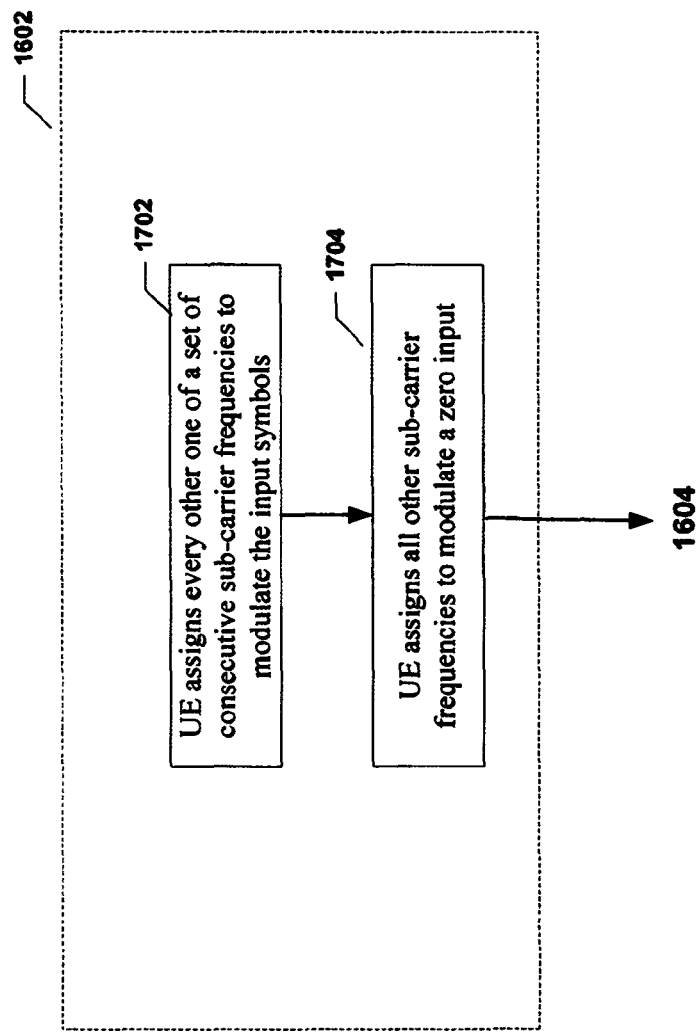

The number of periods in the output may depend on how the input values and the zero input values are interleaved. For example, if the input symbols are assigned to every $L_{th}$ sub-carrier of a set of consecutive sub-carriers, and all other sub-carriers are assigned input values of zero, the output will have L periods that are replicas of each other. A specific example is provided in FIG. 17, which shows a flow diagram that illustrates steps of the inverse Fourier transform performed at step 1602.

In an embodiment, the step includes step 1702, in which the UE assigns every other one of a set of consecutive sub-carrier frequencies to modulate the input symbols. In other words, the UE assigns every $2^{nd}$ one of a set of consecutive sub-carrier frequencies to modulate input symbols.

In step 1704, the UE assigns all other sub-carrier frequencies to modulate an input value of zero. The output of the IDFT will thus have 2 periods that are replicas of each other. In step 1604, the UE will extract one of the two periods. The extracted signal represents the shortened symbol, which may be appended to a cyclical prefix and then transmitted with a guard period.

Figure 18:
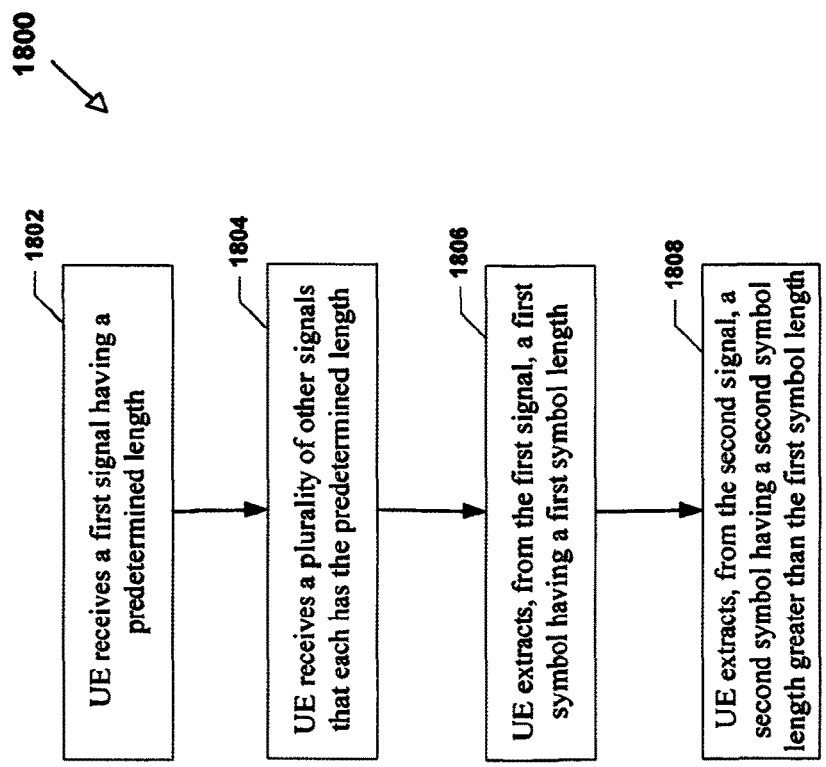

FIG. 18 provides a flow diagram that illustrates a process 1800 from the perspective of a UE receiving D2D or cellular communication. In an embodiment, process 1800 begins at step 1802, in which an UE receives a first signal having a predetermined length (e.g., M+L_CP samples) (the length may be referred to as a "symbol length"). The first signal may be received during a first sub-slot of a radio sub-frame, and may include a guard period having a guard period length.

In step 1804, the UE may receive a plurality of other signals that each has the predetermined length (e.g., M+L_CP samples). The plurality of other signals may be received in, for example, middle sub-slots of a radio sub-frame.

In step 1806, the UE may extract, from the first signal, a first symbol having a first symbol length (e.g., M/2 or M/2+L_CP samples). In the example, a sum of the first symbol length and the guard period length is less than or equal to the predetermined length.

In step 1808, the UE may extract, from one of the plurality of other signals, a second symbol having a second symbol length (e.g., M samples or M+L_CP samples). In the example, the second symbol length is equal to the predetermined length of the sub-slot.

Figure 19A:
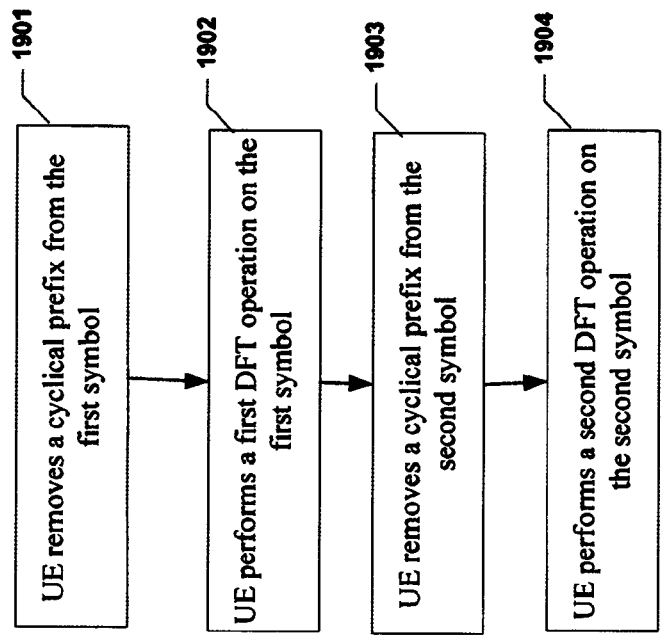

FIG. 19A illustrates an embodiment for further processing the received signals in a UE, such as UE 104A. In FIG. 19A, the extracted first symbol is an IDFT-modulated symbol that includes a cyclical prefix and the second symbol is an IDFT-modulated symbol that includes a cyclical prefix. In the illustrated embodiment, in step 1901, the UE removes the cyclical prefix from the first symbol. In step 1902, the UE (e.g., UE 104A) performs a first DFT operation on the first symbol. In the embodiment, step 1902 may be performed after step 1901, and the first DFT operation may require an input length that is equal to the first symbol length minus a cyclical prefix length (e.g., require an input length that is equal to M samples).

In step 1903, the UE removes a cyclical prefix from the first symbol. In step 1904, which may be performed after step 1903, the UE performs a second DFT operation on the second symbol. In an embodiment, the second DFT operation may require an input length that is equal to the second symbol length minus the cyclical prefix length (e.g., require an input length that is equal to M samples).

Figure 19B:
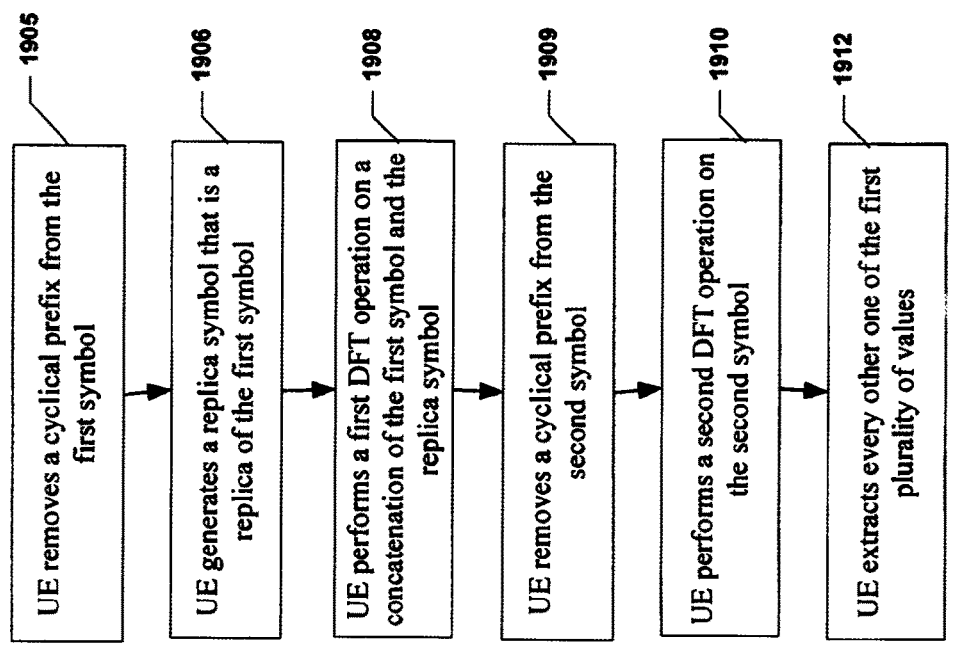

FIG. 19B illustrates another embodiment for further processing the received signals in a UE, such as UE 104B. In the embodiment, the first signal may have been extracted from an output that was periodic. The output may have been periodic because it is an IDFT-modulated symbol in which the inputs to the IDFT operation were interleaved with inputs of zero. In this example, the first symbol length may be M/2+L_CP samples, which indicates that the periodic output had two periods. In step 1905, the UE removes the cyclical prefix from the first symbol. In step 1906, which may be performed after step 1905, the UE generates a replica symbol that replicates the first symbol, so as to reconstruct the periodic output.

In step 1908, the UE performs a first DFT operation on a concatenation of the first symbol and the replica symbol. In the example, the concatenation may have M samples. Thus, the first DFT operation may require an input length equal to the second symbol length minus the cyclical prefix length (e.g., require an input length equal to M samples).

In step 1909, the UE removes the cyclical prefix from the second symbol. In step 1910, which may be performed after step 1909, the UE performs the second DFT operation on the second symbol. In the example, the second DFT operation requires an input length equal to the second symbol length minus the cyclical prefix length (e.g., requires an input length equal to M samples). As steps 1908 and 1910 illustrate, the interleaving of inputs to create a periodic output in a transmitting UE allows the receiving UE to process a received signal without having to modify the size of its DFT component.

Each of the first DFT operation and the second DFT operation may output a plurality of values. For the first DFT operation, the output values correspond to a plurality of symbol values interleaved with zero. In an example in which the received signal was generated from a periodic IDFT output having a period of 2, there may be zero values interleaved between every other symbol value. Thus, to extract the symbol values from the first DFT operation, the UE at step 1912 may extract every other one of the first plurality of values of the first DFT operation.

Exemplary UE

Figure 20:
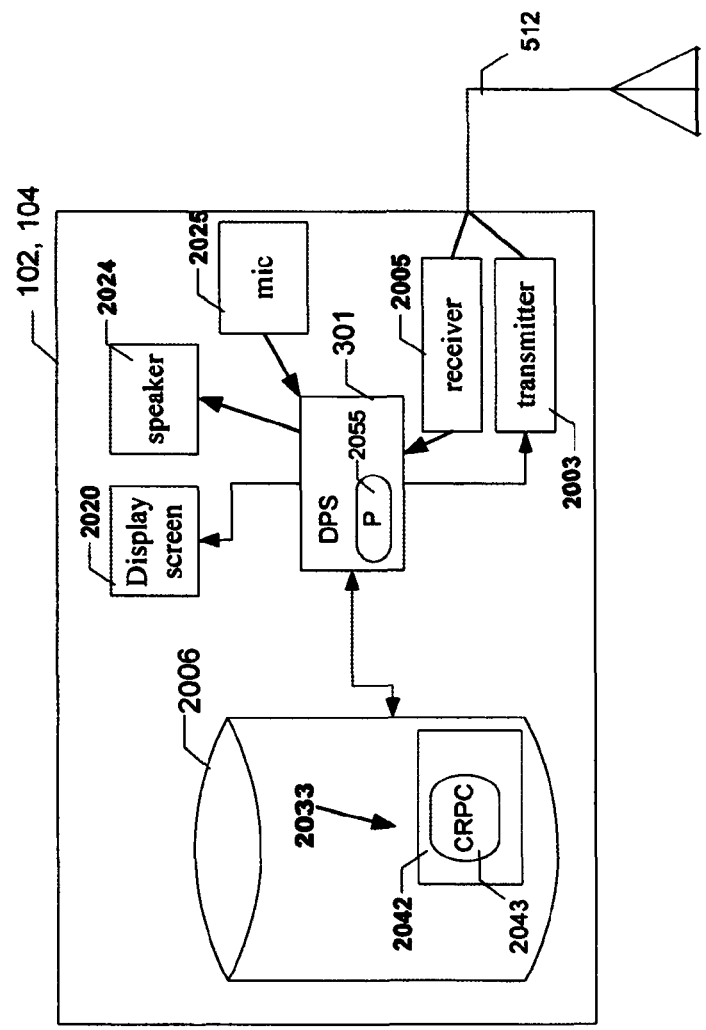
FIG. 20 illustrates a UE according to one embodiment of the present disclosure.

FIG. 20 illustrates a block diagram of an example of the UEs 102 and 104. As shown in FIG. 20, UE 102, 104 includes: the data processing system (DPS) 301 (which includes, e.g., a digital signal processor (DSP), which may include one or more processors (P) 2055 (e.g., microprocessors) and/or one or more circuits, such as an application specific integrated circuit (ASIC), Field-programmable gate arrays (FPGAs), etc.; a transmitter 2003 and receiver 2005, each connected to one of the antennas 512, 514, for wirelessly transmitting and receiving information, respectively; a data storage system 2006, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 301 includes a processor 2055 (e.g., a microprocessor), a computer program product 2033 may be provided, which computer program product includes: computer readable program code 2043 (e.g., instructions), which implements a computer program, stored on a computer readable medium 2042 of data storage system 2006, such as, but not limited, to magnetic media (e.g., a hard disk), optical media (e.g., a DVD), memory devices (e.g., random access memory), etc. In some embodiments, computer readable program code 2043 is configured such that, when executed by data processing system 301, code 2043 causes the data processing system 301 to perform steps described herein (e.g., steps shown in FIGS. 14-19).

In some embodiments, UE 102, 104 is configured to perform steps described above without the need for code 2043. For example, data processing system 301 may consist merely of specialized hardware, such as one or more application-specific integrated circuits (ASICs). Hence, the features of the present invention described above may be implemented in hardware and/or software. For example, in some embodiments, the functional components of UE 102, 104 described above may be implemented by data processing system 301 executing program code 2043, by data processing system 301 operating independent of any computer program code 2043, or by any suitable combination of hardware and/or software.

In a second embodiment, UE 102, 104 may further includes: 1) a display screen 2023 coupled to the data processing system 301 that enables the data processing system 301 to display information to a user of UE 102, 104; 2) a speaker 2024 coupled to the data processing system 2002 that enables the data processing system 301 to output audio to the user of UE 102, 104; and 3) a microphone 2025 coupled to the data processing system 2002 that enables the data processing system 301 to receive audio from the user.

Aspects of D2D Communication

Direct mode or device-to-device (i.e. D2D) communication enables a number of potential gains over cellular communication, because D2D devices are much closer to one another than cellular devices that have to communicate via cellular access point (e.g., eNB). The advantages include the following:

Capacity gain: First, radio resources (e.g. OFDM resource blocks) between the D2D and cellular layers may be reused (reuse gain). Second, a D2D link uses a single hop between the transmitter and receiver points as opposed to the 2-hop link via a cellular AP (hop gain).

Peak rate gain: due to the proximity and potentially favorable propagation conditions high peak rates could be achieved (proximity gain);

Latency gain: When the UEs communicate over a direct link, eNB forwarding is short cut and the end-to-end latency can decrease.

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of transmitting a plurality of output symbols in a plurality of sub-slots, each of the sub-slots having a predetermined sub-slot length, wherein the predetermined sub-slot length is the same for all of the sub-slots, the method comprising:
generating, by a user equipment (UE), a first output symbol having a first symbol length that is shorter than the predetermined sub-slot length;
during a first sub-slot of the plurality of sub-slots, transmitting, by the UE, the first output symbol with a guard period having a guard period length, wherein a sum of the first symbol length and the guard period length is less than or equal to the predetermined sub-slot length, and wherein no transmission is made by the UE during the guard period;
generating, by the UE, a second output symbol having a second symbol length that is greater than the first symbol length and equal to the sum of the first symbol length and the guard period length; and
during a second sub-slot of the plurality of sub-slots, transmitting, by the UE, the second output symbol, wherein the second sub-slot immediately follows the first sub-slot.

2. The method of claim 1, wherein the guard period precedes the transmission of the first output symbol, the method further comprising:
generating an end output symbol having the first symbol length; and
immediately following the transmission of the plurality of other output symbols, transmitting the end output symbol with the guard period, wherein the guard period follows the transmission of the end output symbol.

3. The method of claim 1, wherein the first output symbol is a first OFDM symbol of a sub-frame, wherein the plurality of other output symbols are middle OFDM symbols of the sub-frame, and wherein the end output symbol is the last OFDM symbol of the sub-frame.

4. The method of claim 1, wherein the first output symbol is a first IDFT-modulated symbol of a sub-frame, wherein the plurality of other output symbols are middle IDFT-modulated symbols of the sub-frame, and wherein the end output symbol is the last IDFT-modulated symbol of the sub-frame.

5. The method of claim 1, wherein the first symbol length is substantially half of the predetermined sub-slot length.

6. The method of claim 1, wherein generating the first output symbol comprises performing a frequency modulation operation on a first set of input symbols, and
wherein generating one of the plurality of other output symbols comprises performing the frequency modulation operation on a second set of input symbols,
wherein the first set of input symbols is smaller than the second set of input symbols.

7. The method of claim 6, wherein the first set of input symbols is half the size of the second set of input symbols.

8. The method of claim 6, wherein each of the first set of input symbols and the second set of input symbols are one or more bits that have been encoded by a modulation and coding scheme (MCS) component.

9. The method of claim 6, wherein the frequency modulation operation is an inverse Fourier transform that uses a set of consecutive sub-carrier frequencies.

10. A method of transmitting output symbols in sub-slots, each of the sub-slots having a predetermined length, the method comprising:
generating, by a user equipment (UE), a first output symbol having a first symbol length that is shorter than the predetermined length;
transmitting, by the UE, the first output symbol with a guard period having a guard period length, wherein a sum of the first symbol length and the guard period length is less than or equal to the predetermined length, and wherein no transmission is made by the UE during the guard period;
generating, by the UE, a plurality of other output symbols that each have the predetermined length; and
immediately following the transmission of the first output symbol, transmitting, by the UE, the plurality of other output symbols;
wherein generating the first output symbol comprises performing a frequency modulation operation on a first set of input symbols, and
wherein generating one of the plurality of other output symbols comprises performing the frequency modulation operation on a second set of input symbols;
wherein the first set of input symbols is smaller than the second set of input symbols;
wherein the frequency modulation operation is an inverse Fourier transform that uses a set of consecutive sub-carrier frequencies; and
wherein generating the first output symbol comprises:
generating, with the inverse Fourier transform, a periodic output by interleaving a set of inputs that are all zero among the input symbols,
wherein the interleaving comprises assigning non-consecutive sub-carrier frequencies to modulate the input symbols, and comprises assigning sub-carrier frequencies that are between the non-consecutive sub-carrier frequencies to modulate the set of inputs that are all zero;
extracting one period of the periodic output; and
adding a cyclical prefix to the extracted output, wherein the first output symbol includes only the extracted output with the added cyclical prefix.

11. The method of claim 10, wherein a total number of input symbols and inputs of zero used to generate the first output symbol is equal to a total number of input symbols and inputs of zero used to generate one of the plurality of other output symbols.

12. The method of claim 9, wherein generating the periodic output comprises generating an output having two periods by assigning every other one of a set of consecutive sub-carrier frequencies to modulate the input symbols, and by assigning all other sub-carrier frequencies to modulate inputs of zero.

13. A method of receiving a plurality of output symbols in a plurality of sub-slots, each of the sub-slots having a predetermined sub-slot length, wherein the predetermined sub-slot length is the same for all of the sub-slots, the method comprising:
    during a first sub-slot of the plurality of sub-slots, receiving, by a user equipment (UE), a first signal having the predetermined sub-slot length, wherein the first signal includes a guard period with a guard period length;
    during a second sub-slot of the plurality of sub-slots, receiving, by the UE, a second signal having the predetermined sub-slot length, wherein the second signal does not include any guard period and the second sub-slot immediately follows the first sub-slot;
    extracting, from the first signal, a first symbol having a first symbol length, wherein a sum of the first symbol length and the guard period length is less than or equal to the predetermined sub-slot length; and
    extracting, from the second signal, a second symbol having a second symbol length, wherein the second symbol length is greater than the first symbol length and equal to the sum of the first symbol length and the guard period length.

14. The method of claim 13, wherein the first symbol is an IDFT-modulated symbol that includes a cyclical prefix and the second symbol is an IDFT-modulated symbol that includes a cyclical prefix, the method further comprising:
    removing the cyclical prefix from the first symbol;
    performing a first DFT operation on the first symbol, wherein the first DFT operation requires an input length equal to the first symbol length minus a cyclical prefix length;
    removing the cyclical prefix from the second symbol;
    performing a second DFT operation on the second symbol, wherein the second DFT operation requires an input length equal to the second symbol length minus the cyclical prefix length.

15. The method of claim 13, wherein the first symbol length is substantially half of the first symbol length.

16. The method of claim 15, wherein the first symbol is an IDFT-modulated symbol that includes a cyclical prefix and the second symbol is an IDFT-modulated symbol that includes a cyclical prefix, the method further comprising:
    removing the cyclical prefix from the first symbol;
    generating, after the cyclical prefix has been removed from the first symbol, a replica symbol that is a replica the first symbol;
    performing, after the cyclical prefix has been removed from the first symbol, a first DFT operation on a concatenation of the replica symbol and the first symbol, wherein the first DFT operation requires an input length equal to the second symbol length minus a cyclical prefix length, and wherein the first DFT operation outputs a first plurality of values;
    removing the cyclical prefix from the second symbol;
    performing, after the cyclical prefix has been removed from the second symbol, a second DFT operation on the second symbol, wherein the second DFT operation requires an input length equal to the second symbol length minus the cyclical prefix length, and wherein the second DFT operation outputs a second plurality of values; and
    extracting every other one of the first plurality of values.

17. A user equipment (UE) for transmitting output symbols in sub-slots, each of the sub-slots having a predetermined sub-slot length, the UE comprising:
    a processing system; and
    a data storage system, said data storage system comprising instructions that, when executed by said processing system, causes the UE to:
    generate a first output symbol having a first symbol length that is shorter than the predetermined sub-slot length;
    during a first sub-slot of the plurality of sub-slots, transmit the first output symbol with a guard period having a guard period length, wherein a sum of the first symbol length and the guard period length is less than or equal to the predetermined sub-slot length, and wherein no transmission is made by the UE during the guard period;
    generate a second output symbol having a second symbol length that is greater than the first symbol length and equal to the sum of the first symbol length and the guard period length; and
    during a second sub-slot of the plurality of sub-slots, transmit the second output symbol, wherein the second sub-slot immediately follows the first sub-slot.

* * * * *